(12) United States Patent
Isaacs

(10) Patent No.: US 11,663,169 B2
(45) Date of Patent: May 30, 2023

(54) DYNAMIC ASSET MANAGEMENT SYSTEM AND METHODS FOR AUTOMATICALLY TRACKING ASSETS, GENERATING ASSET RECORDS FOR ASSETS, AND LINKING ASSET RECORDS TO OTHER TYPES OF RECORDS IN A DATABASE OF A CLOUD COMPUTING SYSTEM

(71) Applicant: salesforce.com, inc., San Francisco, CA (US)

(72) Inventor: Charles Hart Isaacs, Annapolis, MD (US)

(73) Assignee: salesforce.com, inc.

( * ) Notice: Subject to any disclaimer, the term of this patent is extended or adjusted under 35 U.S.C. 154(b) by 467 days.

(21) Appl. No.: 16/774,435

(22) Filed: Jan. 28, 2020

(65) Prior Publication Data

US 2021/0232548 A1 Jul. 29, 2021

(51) Int. Cl.
| | | |
|---|---|---|
| *G06F 16/90* | (2019.01) | |
| *G06F 16/22* | (2019.01) | |
| *G06F 16/28* | (2019.01) | |
| *G06F 16/182* | (2019.01) | |
| *G06F 9/54* | (2006.01) | |
| *B64C 39/02* | (2023.01) | |
| *G06V 20/10* | (2022.01) | |
| *B64U 101/30* | (2023.01) | |

(52) U.S. Cl.
CPC ........ *G06F 16/1824* (2019.01); *B64C 39/024* (2013.01); *G06F 9/547* (2013.01); *G06V 20/176* (2022.01); *B64U 2101/30* (2023.01)

(58) Field of Classification Search
CPC ... G06F 16/1824; G06F 9/547; G06V 20/176; B64C 39/024; B64C 2201/127
USPC ......................................................... 707/827
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Anne-Lucie Vion, Software Asset Management and Cloud Computing, 2018.

*Primary Examiner* — Albert Kir
(74) *Attorney, Agent, or Firm* — LKGlobal | Lorenz & Kopf, LLP

(57) ABSTRACT

Methods and systems are provided for automatically generating asset records that are stored and maintained at a database system of a cloud-based computing system. Asset information can be acquired for assets from sources regarding the assets or a representation of the assets. The asset information can be processed to detect assets and analyzed to determine an asset type for each detected asset. For each detected asset, based on an asset type of that detected asset, pertinent header information for that detected asset can be extracted (e.g., asset information and data for that detected asset, associated properties of each detected asset, etc.). An asset record for each detected asset can then be generated, and then stored at the database system, for example, as a row in an asset object of the database system, where each asset record for each detected asset includes pertinent header information for that detected asset.

19 Claims, 13 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,676,486 B1 * | 3/2010 | Tulkoff ................. G06F 16/214 |
| | | 707/999.102 |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,892,467 B2 * | 2/2018 | Shak ..................... G06Q 40/12 |
| 10,037,778 B1 * | 7/2018 | Farhan ............... G11B 20/1217 |
| 11,216,889 B1 * | 1/2022 | Gray ..................... G06V 20/20 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0169653 A1 | 11/2002 | Greene et al. |
| 2003/0004971 A1 | 1/2003 | Gong |
| 2003/0018705 A1 | 1/2003 | Chen et al. |
| 2003/0018830 A1 | 1/2003 | Chen et al. |
| 2003/0055668 A1 | 3/2003 | Saran et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0041443 A1 * | 2/2006 | Horvath, Jr. ........... G06Q 30/06 |
| | | 358/1.18 |
| 2006/0195563 A1 * | 8/2006 | Chapin ............... H04L 67/1095 |
| | | 709/224 |
| 2008/0011842 A1 * | 1/2008 | Curry ................... G06Q 10/087 |
| | | 705/28 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0265221 A1 | 10/2009 | Woods et al. |
| 2011/0137940 A1 * | 6/2011 | Gradin ................. G06F 16/972 |
| | | 707/769 |
| 2011/0247051 A1 | 10/2011 | Bulumulla et al. |
| 2012/0042218 A1 | 2/2012 | Cinarkaya et al. |

(56) References Cited

U.S. PATENT DOCUMENTS

| | | | |
|---|---|---|---|
| 2012/0078917 A1* | 3/2012 | Gradin | G06F 16/23 |
| | | | 707/E17.084 |
| 2012/0218958 A1 | 8/2012 | Rangaiah et al. | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0032664 A1* | 1/2014 | Wookey | H04L 51/214 |
| | | | 709/204 |
| 2014/0336785 A1 | 11/2014 | Asenjo et al. | |
| 2014/0363059 A1 | 12/2014 | Hurewitz | |
| 2018/0018307 A1* | 1/2018 | Wu | G06F 3/0484 |
| 2018/0322376 A1 | 11/2018 | Henry et al. | |
| 2021/0109837 A1 | 4/2021 | Rakshit | |

* cited by examiner

US 11,663,169 B2

DYNAMIC ASSET MANAGEMENT SYSTEM AND METHODS FOR AUTOMATICALLY TRACKING ASSETS, GENERATING ASSET RECORDS FOR ASSETS, AND LINKING ASSET RECORDS TO OTHER TYPES OF RECORDS IN A DATABASE OF A CLOUD COMPUTING SYSTEM

TECHNICAL FIELD

Embodiments of the subject matter described herein relate generally to cloud-based computing. More particularly, embodiments of the subject matter relate to cloud-based computing platform having dynamic asset management system and methods for tracking of assets, automatically generating asset records and linking asset records to other types of records, generating interactive simulations representing assets based on asset records, and generating actions in response to interaction with assets.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application feature software between multiple sets of users.

A cloud-based computing environment can include a number of different data centers, and each data center can include a number of instances, where each instance can support many tenants (e.g., 10,000 tenants or more). As such, large numbers of tenants can be grouped together into and share an instance as tenants of that instance. Each tenant is its own organization (or org) that is identified by a unique identifier (ID) that represents that tenant's data within an instance.

Asset management within large organizations presents numerous challenges. For example, location, use and management of assets need to be tracked. That requires intensive time in keeping of accurate records regarding where assets are at a given time, who assets are with, assigned or linked to, when they can be used, who needs to be altered regarding their usage and what levels of permission attach, what each asset is being used for or where it is located at any given time, how the asset is being used and why, why information about an asset is important to some end user who uses or otherwise interacts with that asset, etc. Accurate record keeping and knowledge of everything about an asset can be important to many different people throughout an organization. Maintaining asset records in a way that is easily accessible and interactive, as well as links between asset records to other types of records that are associated therewith, can present an enormous burden to end users who seek to manage, deploy, produce, or sell such assets.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
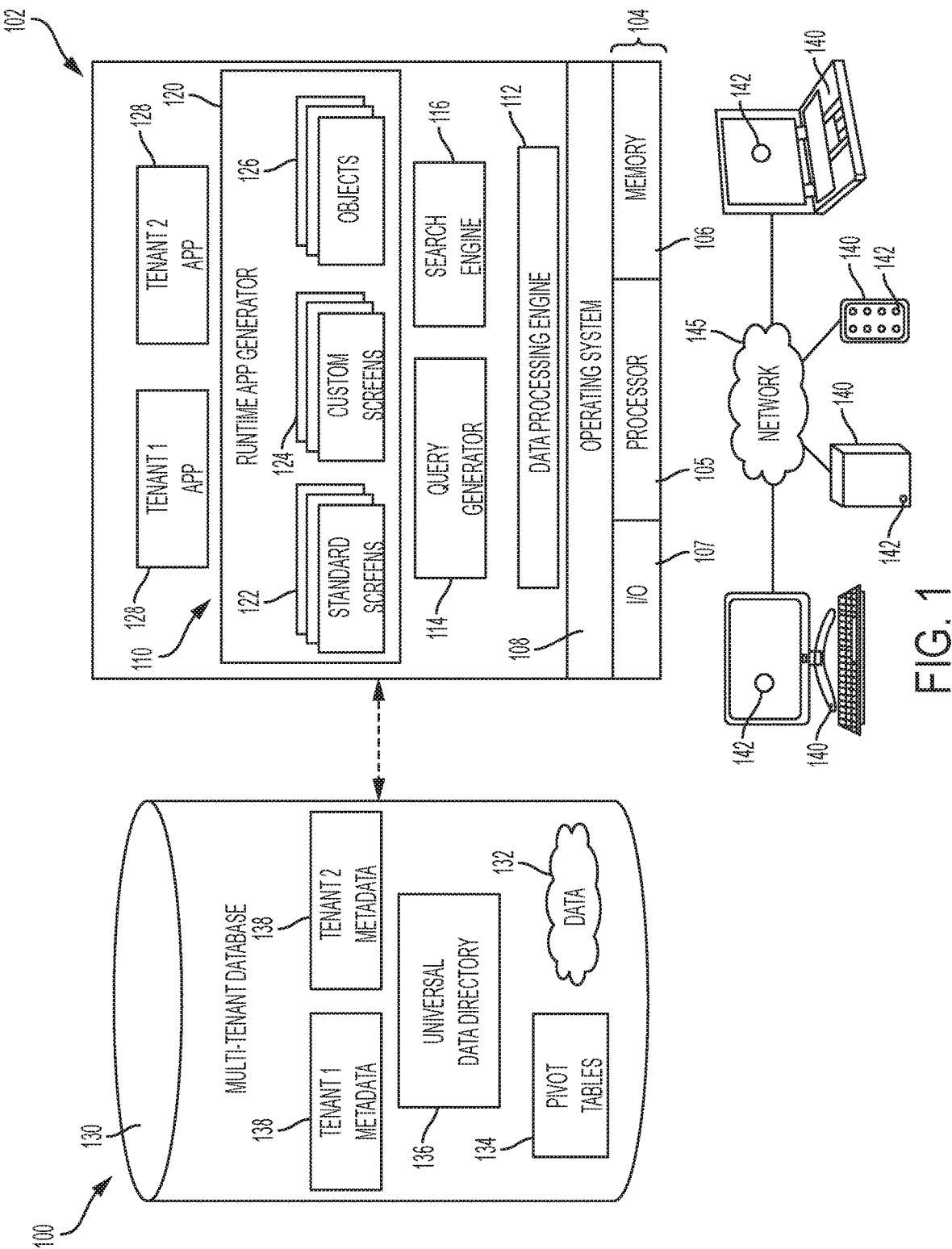
FIG. 1 is a schematic block diagram of an example of a multi-tenant computing environment in which features of the disclosed embodiments can be implemented in accordance with the disclosed embodiments.

In some cases, especially within the context of systems, like those described above, it would be desirable to provide end users with easy ways to accomplish such tasks and others that are almost innumerable depending on the context of a particular asset and it's status within an organization. For instance, it would be desirable to provide a dynamic asset management system that can automatically help generate "asset records" that can help manage assets within a database system using various sources of input data or information regarding those assets that are to be managed.

Once records for assets have been created, the possibilities for using those automatically generated "asset records" increases. As a few, non-limiting, disclosed examples, automatically generated "asset records," can be further processed to provide end users with interactive simulations representing assets, and/or to generate automatic actions in response to interaction with assets that a group seeks to manage. These non-limiting use cases provide a few examples of valuable user experiences that can be provided to the end users of an organization, company, or any user within a group of users.

To address some of the challenges noted above, an application, system, method, techniques and technologies are provided.

In one embodiment, a method is provided for automatically generating asset records that are stored and maintained at a database system of a cloud-based computing system. In accordance with the method, asset information and data can be acquired for a plurality of assets from sources of information and data regarding the assets or a representation of the assets. The asset information and data can be processed to detect assets and the asset information and data for each of the detected assets can be analyzed to determine an asset type for each detected asset. For each detected asset, based on an asset type of that detected asset, pertinent header information for that detected asset can be extracted. The pertinent header information for each asset comprises the asset information and data for that detected asset, and associated properties of each detected asset. An asset record for each detected asset can then be generated, and the generated asset records can then be stored at the database system of the cloud-based computing system. For example, in one implementation, the generated asset records for each detected asset can be stored as a row in an asset object of the database system, and each asset record for each detected asset can include pertinent header information for that detected asset. In one embodiment, the assets are physical objects located at specific locations in an environment, and the associated properties of each detected asset can include a name, an identifier and a location of that detected asset within the environment.

In one embodiment, the method can also include determining other records (stored at and maintained by the database system) that are associated with each of the generated asset records, and linking, each generated asset record to the other records that are determined to be associated with that generated asset record, to generate linking information that links each generated asset record to one or more other records that are determined to be associated with that generated asset record. Optionally, as asset records change or when assets represented by asset records are interacted with, the linking information between asset records and other records can be updated. In one implementation, the one or more other records can include, for example, other types of custom records and standard records that are stored at the database system of the cloud-based computing system. To explain further, in one embodiment, the database system can include a plurality of different types of objects, where each object is either a type of standard object or a type of custom object defined by the database system. There are different types of standard objects and different types of custom objects. Each standard object includes one or more pre-defined fields that are common for each organization that utilizes the cloud computing platform, and each custom object includes one or more custom fields defined by a particular organization for that custom object. The other types of custom records can be stored as part of one of the custom objects defined by the database system of the cloud-based computing system (e.g., where each custom record in an instance of one of the custom objects), and the other types of standard records can be stored as part of one of the standard objects defined by the database system of the cloud-based computing system (e.g., where each standard record in an instance of one of the standard objects).

The sources of the information and data can vary depending on the implementation. For example, in one implementation, the sources of the information and data regarding the assets (or the representation of assets) can include things such as an imaging device configured to acquire an image of an asset and process data to generate the information and data regarding the assets; a vision detection system configured to acquire or extract vision detection data from an environment and process data to generate the information and data regarding the assets; and/or a drone equipped with a camera configured to acquire images of assets and process data to generate the information and data regarding the assets. In another implementation, the sources of the information and data regarding the assets (or the representation of assets) can include things such as an electronic blueprint of an environment that describes an asset within an environment and includes asset information and data, and/or files that describe an asset and that include asset information and data. In another implementation, the sources of the information and data regarding the assets (or the representation of assets) can include things such as a source that provides information and data that identifies a three-dimensional location of an asset and characteristics of the asset; and/or manual configuration information that describes an asset including information and data that identifies the three-dimensional location of the asset and the characteristics of the asset. In another implementation, the sources of the information and data regarding the assets (or the representation of assets) can include things such as a processor configured to process data and to generate information and data regarding the assets or the representation of assets. In one implementation, the data processed by the processor can be acquired by an application programming interface (API) that is used to acquire information that describes an asset.

In one embodiment, a cloud-based computing system is provided that includes a database system configured to configured to maintain records, where each record is an instance of an object, and a server system comprising at least one hardware-based processing system. The server system can be used to implement a dynamic asset creation and management system for automatically creating asset records that are stored and maintained in the database system. The dynamic asset creation and management system includes an asset record generator module. When executed by the at least one hardware-based processing system the asset record generator module is configurable to cause: acquiring, at an asset an application programming interface (API) endpoint, asset information and data for a plurality of assets, from sources of information and data regarding the assets or a representation of the assets; processing the asset information and data, at an asset type analysis module, to detect assets and analyzing the asset information and data for each of the detected assets to determine an asset type for each detected asset; extracting, for each detected asset based on an asset type of that detected asset, pertinent header information for that detected asset that comprises the asset information and data for that detected asset and associated properties of each detected asset; and generating an asset record for each detected asset, and storing the generated asset records at the database system of the cloud-based computing system. In one embodiment, the generated asset records for each detected asset can be stored, via an application programming interface (API), as a row in an asset object of the database system. Each asset record for each detected asset can include pertinent header information for that detected asset.

In one embodiment, the dynamic asset creation and management system can also include an asset record linking module, that when executed by the at least one hardware-based processing system, is configurable to cause: determining other records that are associated with each of the generated asset records, wherein the other records are stored at and maintained by the database system of the cloud-based computing system; and linking, each generated asset record to the other records that are determined to be associated with that generated asset record, to generate linking information that links each generated asset record to one or more other records that are determined to be associated with that generated asset record. The asset record linking module can also cause updating of the linking information between asset records and other records (e.g., as asset records change or when assets represented by asset records are interacted with).

In one embodiment, a system is provided. The system can include at least one hardware-based processor and memory. The memory comprises processor-executable instructions encoded on a non-transient processor-readable media. The processor-executable instructions, when executed by the processor, are configurable to cause: acquiring, at an asset an application programming interface (API) endpoint, asset information and data for a plurality of assets, from sources of information and data regarding the assets or a representation of the assets; processing the asset information and data to detect assets and analyzing the asset information and data for each of the detected assets to determine an asset type for each detected asset; extracting, for each detected asset based on an asset type of that detected asset, pertinent header information for that detected asset that comprises the asset information and data for that detected asset and associated properties of each detected asset; and generating an asset record for each detected asset; and storing, via an application programming interface (API), the generated asset records at a database system as a row in an asset object of the database system. Each asset record for each detected asset can include pertinent header information for that detected asset.

In one embodiment, the processor-executable instructions, when executed by the processor, are further configurable to cause: determining other records that are associated with each of the generated asset records, wherein the other records are stored at and maintained by the database system of the cloud-based computing system; and linking, each generated asset record to the other records that are determined to be associated with that generated asset record, to generate linking information that links each generated asset record to one or more other records that are determined to be associated with that generated asset record.

In one embodiment, a method is provided for generating an interactive simulation representing one or more assets based on one or more asset records. In accordance with the method, based on information from asset records stored at a database system of a cloud-based computing system, an asset simulator module, executed at a cloud-based computing system, can generate one or more simulated representations of the assets. A simulator application executed at the cloud-based computing system can augment the simulated representations of the assets with additional information from the asset records stored in the database system, and generate a user interface that presents an interactive simulation of the assets. The user interface can include the simulated representations of the assets with the additional information from the asset records stored in the database system.

For example, in one embodiment, a virtual reality module of the simulator application can generate a virtual simulation that includes the simulated representations of the assets. In one embodiment, the virtual reality module of the simulator application can combine real world images with virtual images or entities that represent real-world objects simulated via a computer to present the user interface. In one implementation, the user interface can include a field of view that presents the virtual simulation that incorporates the simulated representations of the assets with real-world images to present virtual images of the simulated representations of the assets.

In one embodiment, an augmented reality module of the simulator application can generate a user interface that presents: an augmented simulation with the simulated representations of the assets along with the additional information that supplements or augments the simulated representations of the assets. The additional information can extracted from one or more of: the asset records stored in the database system; other additional information from other records stored in the database system; and one or more sources that are external to the cloud-based computing system.

In one embodiment, the user interface comprises: the simulated representations of the assets with the additional information from the asset records stored in the database system and information about other standard or custom records stored in the database system that have been linked to the asset records by an asset record linking module.

In one embodiment, the method further comprises: receiving, at the simulator application, data regarding human activities or interactions with assets; and processing the data regarding human activities or interactions with assets to simulate a customer experience that presents simulated physical representations of the assets including virtual or augmented versions of the assets.

In one embodiment, a cloud-based computing system is provided for generating an interactive simulation representing one or more assets based on one or more asset records. The cloud-based computing system can include a database system configured to maintain records, where each record is an instance of an object; and a server system comprising at least one hardware-based processing system. The server system comprises an asset record simulator module and a simulator application. The asset record simulator module, when executed by the at least one hardware-based processing system, is configurable to cause: generating one or more simulated representations of the assets based on information from the asset records that are stored and maintained in the database system. The simulator application, when executed by the at least one hardware-based processing system, is configurable to cause: augmenting the simulated representations of the assets with additional information from the asset records stored in the database system; and generating a user interface that presents an interactive simulation of the assets. The user interface comprises: the simulated representations of the assets with the additional information from the asset records stored in the database system.

In one embodiment, augmenting comprises generating a virtual simulation that includes the simulated representations of the assets via a virtual reality module of the simulator application. In one implementation, generating the virtual simulation that includes the simulated representations of the assets, comprises: combining, via the virtual reality module of the simulator application, real world images with virtual images or entities that represent real-world objects simulated via a computer to present the user interface. The user interface may comprise a field of view that presents the virtual simulation that incorporates the simulated representations of the assets with real-world images to present virtual images of the simulated representations of the assets.

In another embodiment, the augmenting comprises: generating, via an augmented reality module of the simulator application, the user interface that presents: an augmented simulation with the simulated representations of the assets along with the additional information that supplements or augments the simulated representations of the assets. In one implementation, the additional information is extracted from one or more of: the asset records stored in the database system; other additional information from other records stored in the database system; and one or more sources that are external to the cloud-based computing system.

In another embodiment, the user interface comprises the simulated representations of the assets with the additional information from the asset records stored in the database system and information about other standard or custom records stored in the database system that have been linked to the asset records by an asset record linking module.

In one embodiment, when the simulator application receives data regarding human activities or interactions with assets, it can process that data to simulate a customer experience that presents simulated physical representations of the assets including virtual or augmented versions of the assets.

In one embodiment, a system is provided. The system can include at least one hardware-based processor and memory. The memory comprises processor-executable instructions encoded on a non-transient processor-readable media. The processor-executable instructions, when executed by the processor, are configurable to cause: generating one or more simulated representations of the assets based on information from asset records stored at a database system of a cloud-based computing system; augmenting the simulated representations of the assets with additional information from the asset records stored at the database system; and generating a user interface that presents an interactive simulation of the assets, wherein the user interface comprises: the simulated representations of the assets with the additional information from the asset records stored in the database system.

In one embodiment, the processor-executable instructions, when executed by the processor, are further configurable to cause: generating a virtual simulation that includes the simulated representations of the assets via a virtual reality module of the simulator application by: combining, via the virtual reality module of the simulator application, real world images with virtual images or entities that represent real-world objects simulated via a computer to present the user interface. The user interface comprises: a field of view that presents the virtual simulation that incorporates the simulated representations of the assets with real-world images to present virtual images of the simulated representations of the assets.

In one embodiment, the processor-executable instructions, when executed by the processor, are further configurable to cause: generating, via an augmented reality module of the simulator application, the user interface that presents: an augmented simulation with the simulated representations of the assets along with the additional information that supplements or augments the simulated representations of the assets. The additional information can be extracted from one or more of: the asset records stored in the database system; and other additional information from other records stored in the database system.

In another embodiment, the user interface comprises the simulated representations of the assets with the additional information from the asset records stored in the database system and information about other standard or custom records stored in the database system that have been linked to the asset records.

In another embodiment, a method is provided for generating one or more actions in response to an interaction with an asset. An asset interaction detector can detect an interaction with an asset, and in response to information that is indicative of the interaction with the asset, at least some information can be accessed from an asset record, related to the asset, from a database system of a cloud-based computing system. An action generator module can process the information from the asset record and the information that is indicative of the interaction with the asset to generate at least one action in response to the information that is indicative of the interaction with the asset.

In one embodiment, the information from the asset record comprises header information, and the action generator module processes the header information from the asset record and the information that is indicative of the interaction with the asset to generate context information. An action engine of the action generator module then processes, using contextual rules, the context information and the information that is indicative of the interaction with the asset to generate the at least one action (in response to the information that is indicative of the interaction with the asset).

The context information can be from the database system or other external sources. For instance, in some non-limiting embodiments, the context information comprises on or more of: customer demographics, customer type, asset type, CRM information, rules, and other data from other external sources.

In one embodiment, the action generator module can trigger, in response to the information that is indicative of the interaction with the asset, at least one workflow in response to that interaction. The workflow can be an automated business process specified using any number of workflow rules, where each workflow rule causes a workflow action when designated conditions of that workflow rule are met. For instance, a workflow can be business logic that evaluates a record and determines if an automated action is to occur when the designated criteria defined by a workflow rule are satisfied.

In another embodiment, the action generator module can create, in response to the information that is indicative of the interaction with the asset, at least one new record within the database system that is associated with the asset record for the asset.

In another embodiment, the action generator module can generate, in response to the information that is indicative of the interaction with the asset, a notification that indicates information about the asset being interacted with.

In another embodiment, the action generator module can generate based on the asset record, in response to the information that is indicative of the interaction with the asset, at least one interactive user interface that includes information about the asset. The at least one interactive user interface can be displayed, for example, at a user system. In response to another interaction with the at least one interactive user interface. the action generator module can generate another action in response to that other interaction.

In another embodiment, the action generator module, can generate, based on another record related to the asset record, in response to the information that is indicative of the interaction with the asset, at least one interactive user interface that includes information about the asset and information from the other record. The interactive user interface can be displayed at a user system.

In one embodiment, a cloud-based computing system is provided for generating one or more actions in response to an interaction with an asset. The cloud-based computing system can include a database system and a server system. The database system is configured to store and maintain records including an asset record for the asset, where each record is an instance of an object. The server system can include at least one hardware-based processing system. The server system can include an asset interaction detector, that when executed by the at least one hardware-based processing system is configurable to cause: detecting an interaction with an asset, and in response to information that is indicative of the interaction with the asset, accessing at least some information from the asset record related to the asset from the database system. The server system can include an action generator module, that when executed by the at least one hardware-based processing system, is configurable to cause: processing of the information from the asset record and the information that is indicative of the interaction with the asset to generate at least one action in response to the information that is indicative of the interaction with the asset.

In one embodiment, the information from the asset record comprises header information, and the action generator module processes the header information from the asset record and the information that is indicative of the interaction with the asset to generate context information. An action engine of the action generator module can process, using contextual rules, the context information and the information that is indicative of the interaction with the asset to generate the at least one action in response to the information that is indicative of the interaction with the asset. The context information is from the database system or other external sources, wherein the context information comprises on or more of: customer demographics, customer type, asset type, CRM information, rules, and other data from other external sources.

For example, in one embodiment, the action generator module can trigger, in response to the information that is indicative of the interaction with the asset, at least one workflow in response to that interaction. Workflows are described above.

In another embodiment, the action generator module can create, in response to the information that is indicative of the interaction with the asset, at least one new record within the database system that is associated with the asset record for the asset. In another embodiment, the action generator module can generate a notification that indicates information about the asset being interacted with.

In another embodiment, the action generator module can generate based on the asset record, in response to the information that is indicative of the interaction with the asset, at least one interactive user interface that includes information about the asset. The action generator module can also generate, in response to another interaction with the user interface, another action in response to that other interaction.

In another embodiment, the action generator module can generate based on another record related to the asset record, in response to the information that is indicative of the interaction with the asset, at least one interactive user interface that includes information about the asset and information from the other record.

In one embodiment, a system is provided. The system can include at least one hardware-based processor and memory. The memory comprises processor-executable instructions encoded on a non-transient processor-readable media. The processor-executable instructions, when executed by the processor, are configurable to cause: detecting an interaction with an asset; in response to information that is indicative of the interaction with the asset, accessing at least some information from an asset record related to the asset from a database system of a cloud-based computing system, wherein the database system is configured to store and maintain records including the asset record for the asset, wherein each record is an instance of an object; and processing of the information from the asset record and the information that is indicative of the interaction with the asset to generate at least one action in response to the information that is indicative of the interaction with the asset.

Prior to describing the disclosed embodiments, some examples of terminology that is used herein will now be described.

An organization or "org" can refer to a unique identifier (ID) that represents a tenant's data within an instance. Each identifier defines a virtual or logical space provided to an individual tenant (e.g., a deployment of Salesforce with a defined set of licensed users) where all of that tenant's data and applications are stored within an instance so that it is separate from that of all other organizations that are part of that instance. As such, each organization can be identified by its own unique ID that allows that organization's data to be separated from data of other organizations. The ID serves as an access key and a security barrier for an individual tenant's data in the system. An organization can be thought of as a logical container for one cohesive set of related data, metadata, configurations, settings and schemas that is separate from that of all other organizations. An organization includes all of a tenant's data and applications, and is separate from that of all other organizations. Each organization can be highly customized with respect to other organizations that are part of the same instance. Each organization can have its own custom content that is unique to that particular organization. For a particular organization, custom content can include metadata and associated data that is unique to that particular organization. Each organization can be customized using custom fields, custom objects, workflows, data sharing rules, visual force pages and apex coding because even though all tenants with an instance share the same database, the organization ID is stored in every table to ensure that every row of data is linked back to the correct tenant and the data from other tenants sharing the same instance cannot be mixed up.

As used herein, the term "class" can refer to a template or blueprint from which objects are created. An object is an instance of a class. To explain further, all objects have state and behavior, that is, things that an object knows about itself, and things that an object can do. A class can contain variables and methods. Variables are used to specify the state of an object, whereas methods are used to control behavior. A class can contain other classes, exception types, and initialization code.

As used herein, the term "record" can refer to a particular occurrence or instance of a data object that is created by a user or administrator of a database service and stored in a database system, for example, about a particular (actual or potential) business relationship or project. An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service. A list of standard objects that are currently available from Salesforce is provided at https://developer.salesforce.com/docs/atlas.en-us.object_reference.meta/object_reference/sforce_api_objects_list.htm.

A few non-limiting examples of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

One specific type of standard object is an "asset" object. As used herein, an asset can represent an item of commercial value, such as a product sold by a company or a competitor of that company. Assets can be used to store information about a customers' products (e.g., items that a company sells). Assets can represent, for instance, specific products customers have purchased or installed. Assets can be linked to maintenance plans, entitlements, work orders, and more so that the history of an asset (e.g., a customer's product) can be assessed. An asset object can be used to track things about a product (such as products sold to customers). Each asset can be associated with an account or contact. When an application creates a new asset record, it can specify a name and an identifier. In one embodiment, an asset object can include many different fields including an "account" field associated with the asset, and/or a "contact" field that indicates a contact associated with the asset (e.g., an AccountId, ContactId, or both). As such, each asset can be associated with an account and/or contact. An account and contact can, but do not necessarily need to be, related to and linked to each other. In one embodiment, other fields of an asset object can include:

an "asset division" field to which the asset belongs (this value is automatically inherited from the related account if any. Otherwise the value is inherited from the related contact. Available only in organizations that use divisions to segment their data);

an "asset level field" that indicates the asset's position in an asset hierarchy (if the asset has no parent or child assets, its level is 1. Assets that belong to a hierarchy have a level of 1 for the root asset, 2 for the child assets of the root asset, 3 for their children, and so forth.);

an "asset name" filed that identifies a name for the asset;

an "asset owner" field that identifies an individual user to which the asset is assigned (by default, the asset owner is the user who created the asset record);

an "asset provided by" field that specifies the account that provided the asset, typically a manufacturer;

an "asset serviced by" field that indicates the account in charge of servicing the asset;

a "competitor asset" field that indicates whether the asset represents a competitor's product (this checkbox helps track which customers are using a competitor's products);

a "description" field that includes a description of the asset;

install date" field that indicates the date the asset was installed;

internal asset" field that indicates that the asset is produced or used internally;

a "location" field that indicates the asset's location (e.g., this can be the place where the asset is stored, such as a warehouse or van");

a "parent asset" field that indicates the asset's parent asset;

a "price" field that indicates the amount the customer paid for the asset;

a "product" field that indicates the product on which the asset is based;

a "product code" field that indicates the internal code or product number used to identify the related product;

a "product description" field that indicates the description of the related product;

a "product family" field that indicates the related product's category;

a "product SKU" field that indicates the stock keeping unit (SKU) of the related product;

a "purchase date" field that indicates the date the customer bought the asset;

a "quantity" field that indicates the number of assets purchased;

a "root asset" field that indicates the top-level asset in an asset hierarchy. depending on where an asset lies in the hierarchy, its root might be the same as its parent;

a "serial number" field that indicates the model number on the asset;

a "status" field that indicates the asset's status. this picklist contains the following values, which can be customized: a "purchased" field, a "shipped" field, an "installed" field, a "registered" field and an "obsolete" field;

a "usage end date" field that indicates the date the asset expires or the last date it is under warranty. use this field to store whatever date is appropriate for your business;

Assets can also be linked through replacements and upgrades. Assets can be related to each other. Asset hierarchies can be used to create parent-child relationships between assets to represent products with multiple components. To create hierarchical relationships between assets, use the Parent Asset field and the Child Assets related list on asset detail pages. Assets also come with a few additional fields related to hierarchies. The read-only Root Asset field lists the top-level asset in an asset hierarchy. Depending on where an asset lies in the hierarchy, its root might be the same as its parent. If an asset is at the top of a hierarchy, it is its own root asset, and the Parent Asset field is blank. The read-only Asset Level field is a number that reflects the asset's position in a hierarchy. If the asset has no parent or child assets, its level is 1. Assets that belong to a hierarchy have a level of 1 for the root asset, 2 for the child assets of the root asset, 3 for their children, and so forth.

When a customer's asset needs to be replaced or upgraded, the replacement can be tracked on asset detail pages. Asset replacements can be viewed and managed from two related lists on asset detail pages. The primary assets related list shows assets that replaced the current asset. the related assets related list shows assets that the current asset replace For instance, with asset tracking, a client application can quickly determine which products were previously sold or are currently installed at a specific account. Asset tracking is also useful for product support, providing detailed information to assist with product-specific support issues. For example, the PurchaseDate or SerialNumber could indicate whether a given product has certain maintenance requirements, including product recalls. Similarly, the UsageEndDate might indicate when the asset was removed from service or when a license or warranty expires By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long-term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web-based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 embodies the functionality of a collaboration solution such as the Chatter® system.

Figure 2:
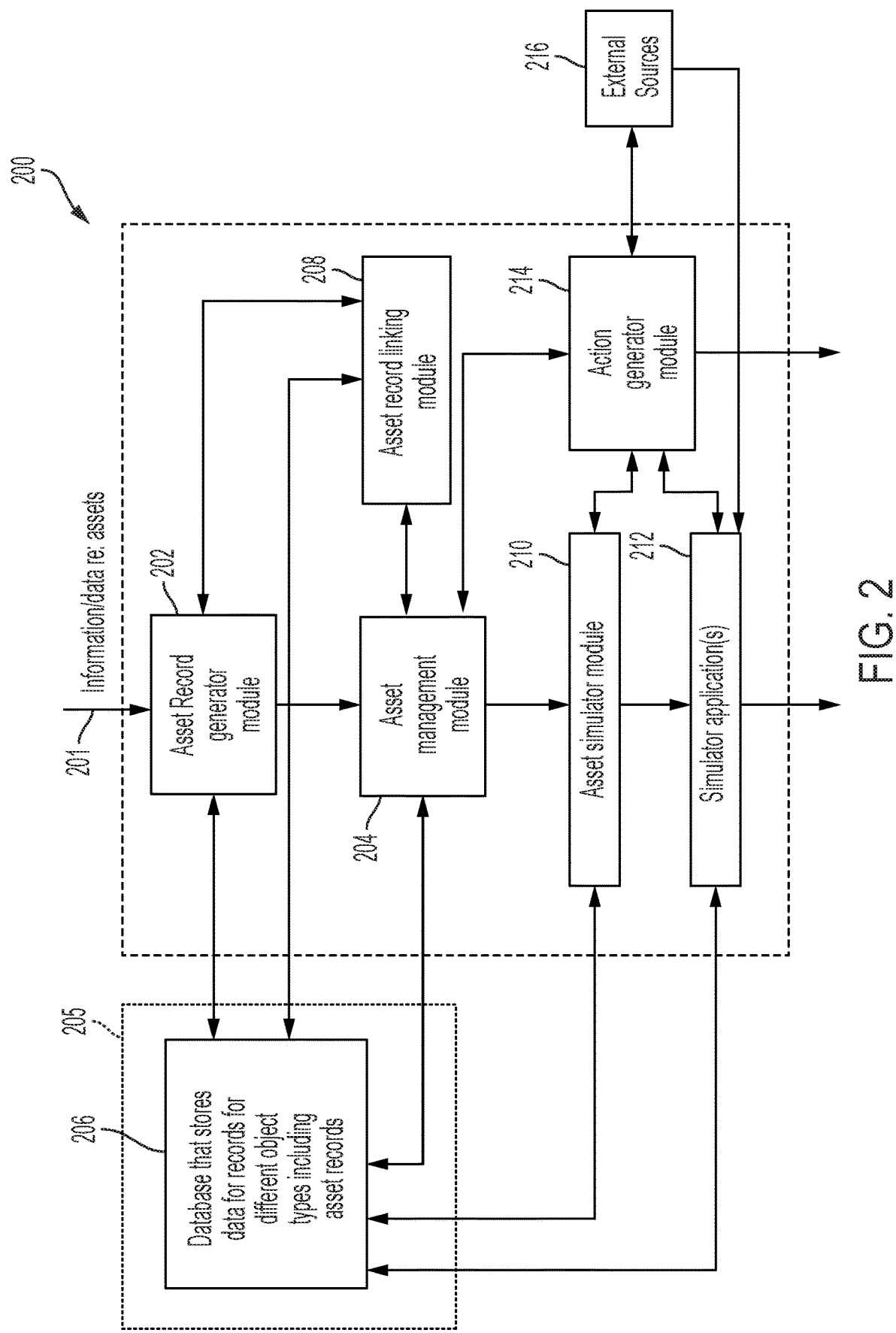
FIG. 2 is a block diagram that illustrates a dynamic asset management system for in accordance with the disclosed embodiments.

FIG. 2 is a block diagram that illustrates a dynamic asset management system 200 for along with a cloud-based computing system 205 having a database system 206 in accordance with the disclosed embodiments. The dynamic asset management system 200 can track assets, generate asset records and store them within the database system 206, link asset records to other types of records, generate interactive simulations representing assets based on the asset records, and generate actions in response to interaction with assets.

In one embodiment, the cloud-based computing system 205 is a system that can be shared by many different organizations, and handles the storage of, and access to, different metadata, objects and records, and data and applications across disparate organizations. In one embodiment, the database system 206 can be implemented as part of, or in conjunction with, a cloud-based computing system 205 including a database system such as the multi-tenant database system 130 that is shown and described above with reference to FIG. 1. In one embodiment, the cloud-based computing system 205 can include a database system 206, such as a multi-tenant database system. The cloud-based computing system 205 is configured to handle requests for any user associated with any organization that is a tenant of the system. Although not illustrated, the cloud-based computing system 205 can include other components such as one or more processing systems that execute applications, other process spaces where other applications run, and program code that will be described in greater detail below.

The cloud-based computing system 205 can include a connectivity engine (not illustrated in FIG. 2) serves as a network interface that allows the dynamic asset management system 200 and user systems (not illustrated in FIG. 2) to establish a communicative connection to the cloud-based computing system 205 over a network (not illustrated in FIG. 2) such as the Internet or any type of network described herein. The cloud-based computing system 205 includes an application platform that allows user systems (not illustrated in FIG. 2) to access various applications provided by the application platform. The application platform can be a cloud-based user interface.

The cloud cloud-based computing system 205 including the application platform (not illustrated in FIG. 2) and database system(s) 206 can be part of one backend system; however, it should be appreciated that the could cloud-based computing system 205 can include other backend systems that can include one or more servers that work in conjunction with one or more databases and/or data processing components. The application platform can also have access to one or more other backend systems and one or more database systems 206 that store information (e.g., records including data and/or metadata) for a number of different organizations including user information, organization information, custom information, etc. The database systems 206 can include a multi-tenant database system 130 as described with reference to FIG. 1, as well as other databases or sources of information that are external to the multi-tenant database system 130 of FIG. 1. In one embodiment, the multi-tenant database system 130 can store data in the form of records and customizations.

The cloud-based computing system 205 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The dynamic asset management system 200 can include an asset record generator module 202, an asset management module 204, an asset record linking module 208, an asset simulator module 210, a simulator application(s) 212 and an action generator module 214. Any of the elements of the dynamic asset management system 200 can be implemented as part of or externally to a system such as that shown and described above with reference to FIG. 1. As such, the dynamic asset management system 200 can communicate with a database system 206 that depending on the implementation can be external to the dynamic asset management system 200, or part of the dynamic asset management system 200, but is illustrated as being external to the dynamic asset management system 200 in the embodiment that is illustrated in FIG. 2.

The dynamic asset management system 200 can also communicate with one or more information and data regarding assets 201 that are external to the dynamic asset management system 200 in the embodiment that is illustrated in FIG. 2. The information and data regarding assets 201 can represent various sources of input data or information, such as, information or data regarding assets that are to be managed by the asset management module 204 and stored in the database system 206. The dynamic asset management system 200 can also communicate with one or more external sources 216 that are external to the dynamic asset management system 200 in the embodiment that is illustrated in FIG. 2. The external sources 216 can represent various sources of input data or information, such as, data indicative or reflective of user interactions with various assets that are generated by the asset record generator module 202, managed by the asset management module 204 and stored in the database system 206.

The asset record generator module 202 can receive (e.g., gather or collect) asset information/data 201 regarding assets from one or more sources. In some implementations, the assets can be physical objects, and the asset information/data regarding those physical objects can be used to generate asset records corresponding to those physical objects. Depending on the implementation, the asset information/data regarding assets 201 regarding assets can be communicated or "pushed" to the asset record generator module 202 from various sources, or can be pulled from various sources by the asset record generator module 202 (e.g., gathered/collected by the asset record generator module 202 from various sources). For each asset, the asset information/data from the various sources can include any representation (e.g., images, Blueprints, XML files, manual config, APIs, information extracted using vision detection technologies such as drones equipped with cameras to acquire information/data that can then be processed to determine asset information/data). In one embodiment, the information and data regarding assets 201 can be acquired by an imaging device or camera (not illustrated in FIG. 2) that can acquire images of assets in an environment that can be processed via a processor or other recognition system, and then used to request data that is pertinent to the information acquired by the imaging device (not illustrated in FIG. 2) and processed using image recognition processing technologies and generate assets records.

In one implementation, the asset record generator module 202 can capture information/data regarding assets 201 that describes assets within an environment, such as a facility, inventory space or other place, by processing high-speed video captured by drone or other robot mounted with cameras (as one example), and then create records within a cloud-based computing system 205 (e.g., Salesforce.com) for each asset. In one implementation, a drone can include advanced optical, RFID, and barcoding sensor technologies that can acquire information/data that can be used to identify three-dimensional locations of assets and generate asset records that describe characteristics of assets.

In one embodiment, the asset record generator module 202 is an entity, that is external to a system such as that shown in FIG. 1, that can process the asset information/data regarding assets 201 regarding assets to generate asset records, and then provide the asset records (along with the information/data used to generate the asset records) to the asset management module 204, the database system 206 and/or the asset record linking module 208. In this embodiment, the asset record generator module 202 can process the asset information/data regarding assets 201 regarding assets to generate asset records, for example, by analyzing representations of assets to determine asset types, and then, extracting, based on an asset type of each asset, pertinent header information for each asset (e.g., asset information and associated properties of that asset). The asset record generator module 202 can then register each of the assets at the database system 206 via an API by creating and storing an asset record for each asset (e.g., as a row in an asset object of a cloud-based computing system 205 (e.g., Salesforce.com®), where each asset record includes corresponding, pertinent header information for each asset).

In another embodiment, the asset record generator module 202 is an entity, that is external to a system such as that shown in FIG. 1, that can send the asset information/data regarding assets 201 regarding assets to an asset API endpoint at the asset management module 204, which can be implemented within or internal to a system such as that shown in FIG. 1. The asset management module 204 can process the asset information/data regarding assets 201 to generate asset records that the asset API endpoint can then provide (along with the information/data used to generate the asset records) to the database system 206 and/or the asset record linking module 208. The asset record generator module 202 can then register each of the assets at the database system 206 via an API endpoint at the asset management module 204 to create and store an asset record for each asset (e.g., as a row in an asset object of a cloud-based computing system 205 (e.g., Salesforce.com), where each asset record includes corresponding, pertinent header information for each asset). Once asset records are created and stored within the database system 206 of the cloud-based computing system 205 they can be used for various purposes as will be described below.

The asset management module 204 can manage and track assets using the asset records. In addition to managing and tracking assets and their associated asset records, the asset management module 204 can also serve as an interface between the database system 206 and other blocks that are illustrated in FIG. 2, such as the asset record generator module 202, the asset record linking module 208, the asset simulator module 210, the action generator module 214, etc. Further processing of the asset information/data regarding assets 201 regarding assets can vary depending on the implementation.

The asset record linking module 208 can link asset records to other types of custom and/or standard records that are maintained by, and stored at, a computing platform that includes the database system 206 to generate linking information that links each asset record to one or more other records having any object type (including other records having an asset object type). While an asset record could be potentially be created that is not linked to or associated with other records, in many cases, asset records that are generated can be linked to other records that are maintained by the database system 206 to generate linking information. The linking information for each asset record links that asset record to other record(s) having an asset object type and/or to other record(s) having other object types that are different than the asset object type. The linking information that is output from the asset record linking module 208 can also be provided to and stored at database system 206 for storage and can also be provided to other modules such as the asset record generator module 202, the asset management module 204, the asset simulator module 210, the simulator application(s) 212, the action generator module 214, etc. for use during processing performed at those other modules.

The asset record linking module 208 can regularly update links between asset records and other types of records. For instance, the asset record linking module 208 can regularly update links between asset records and other types of records as asset records change and/or in response to interaction with assets.

The asset simulator module 210 and the simulator application(s) 212 are illustrated as separate blocks, but can be implemented together in some implementations. In one implementation, the asset simulator module 210 is part of a separate computing platform, whereas in other implementations, the asset simulator module 210 is part of the same computing platform, such as that shown and described with reference to FIG. 1. In one embodiment, the asset simulator module 210 can be implemented as an application or a service provided by a system, such as the system described above with reference to FIG. 1. Alternatively, the asset simulator module 210 can be implemented independently as an application or a service that is external to a system, such as the system described above with reference to FIG. 1. Likewise, in one embodiment, the simulator application(s) 212 can be implemented as an application or a service provided by a system, such as the system described above with reference to FIG. 1. Alternatively, the simulator application(s) 212 can be implemented independently as an application or a service that is external to a system, such as the system described above with reference to FIG. 1. As such, the asset simulator module 210 and the simulator application(s) 212 can be implemented together or separately in accordance with any of the above-described implementations.

Together, the asset simulator module 210 and the simulator application(s) 212 can be implemented to process asset records, along with links between asset records to other types of records that are provided from the asset record linking module 208 or the database system 206, to generate interactive UI simulation data that can either be directly used or processed to generate simulated representations of assets, as well as user interactions with the simulated representations of the assets when processed in conjunction with data provided from the external sources 216. For instance, the interactive UI simulations can include representations of the assets including representations that are generated using virtual or augmented reality technologies.

In one embodiment, one or more of the asset simulator module 210 and the simulator application(s) 212 can be implemented to generate, based on asset records and/or user input(s), simulations of assets using augmented/virtual reality technologies to generate a customer experience (including various user interfaces and interactions therewith). The customer experience can include simulated representations of assets, including physical representations of the assets that are viewable by and interactable with a user. For example, in one embodiment, the virtual and/or augmented versions of the customer experience can include the assets to demonstrate simulated physically visible representations of the locations of the assets to an end user within the context of an environment being observed/viewed along with different indicia of possible interactions with each asset within the environment (with or without sound) as it is being interacted with by a user. Representations in any other known context can also be included.

As one example, the asset simulator module 210 and simulator application(s) 212 can process assets records and various human activities and/or interactions with assets that correspond to those asset records to simulate a customer experience with those assets. In one embodiment, virtual or augmented versions of simulated physical representations of the assets can be generated. The assets can be simulated and supplemented using virtual or augmented reality techniques and technologies to generate simulated versions of the assets to create an interactive customer experience (e.g., UI and corresponding interactions) that allow a user to interact with the assets in a virtual space and discover information about the assets (including information that is part of linked records within the cloud-based computing system 205.

As used herein, virtual reality can refer to a simulated experience that can be similar to or completely different from the real world. Virtual reality systems can generate realistic images, sounds and other sensations that simulate a user's physical presence in a virtual environment. A person using virtual reality equipment is able to look around the artificial world, move around in it, and interact with virtual features or items such as assets. For instance, this effect can be created by VR headset that includes a head-mounted display with a small screen in front of the eyes. Virtual reality may incorporate auditory and video feedback, but may also allow other types of sensory and force feedback through haptic technology.

As used herein, augmented reality can refer to the integration of digital information with the user's environment in real time. Augmented reality technologies can be used, for example, to superimpose a computer-generated image on a user's view of the real world, thus providing a composite view. Unlike virtual reality, which creates a totally artificial environment, augmented reality uses the existing environment and overlays new information on top of it. In one implementation, AR can blend what a user sees in their real surroundings with digital content generated by computer software. The additional software-generated images with a virtual scene typically enhance how the real surroundings look in some way. AR systems can, for example, layer virtual information over a camera live feed into a headset or smartglasses or through a mobile device giving the user the ability to view three-dimensional images. Mixed reality (MR) is the merging of the real world and virtual worlds to produce new environments and visualizations where physical and digital objects co-exist and interact in real time.

Pertinent data can be displayed using virtual and/or augmented reality at a display to provide supplemental information to a user. As used herein, the phrase "using augmented reality" when used in conjunction with the term display or displaying can mean "presenting supplemental information via a graphical user interface." For instance, in one context, the phrase "using augmented reality" when used in conjunction with the term display or displaying can mean "superimposing a computer-generated image or information on a view presented on a graphical user interface to provide a composite view that includes the computer-generated image or information in a view that is presented."

In one embodiment, supplemental information can be retrieved and displayed. The disclosed embodiments can leverage various augmented reality technologies to display pertinent data or supplemental information about what is being observed via a display associated with a user system. The pertinent data or supplemental information can be retrieved from data sources such as backend databases, backend server systems, cloud computing platforms, targets identified by search engines (such as Google Images service or Goggle reverse image search feature of Google Images service), social media platforms or services, and provided to the user system. The disclosed embodiments can simplify retrieval and display of information which would otherwise require access to multiple systems and many manual steps. In one embodiment, recognition processing can be performed locally at a device in parallel with image capture and other processing such that the disclosed methodologies can occur in near real-time (e.g., so that the user perceives a smooth view with no stuttering to the display).

For example, in one embodiment, the asset simulator module 210 can process asset records, along with links between asset records to other types of records that are provided from the asset management module 204 or the database system 206, to generate interactive UI simulation data that can either be directly used, or processed via the simulator application(s) 212, to generate simulated representations of assets, as well as user interactions with the simulated representations of the assets when processed in conjunction with data provided from the external sources 216. In one embodiment, the simulator application(s) 212 can process information provided from the database system 206, the asset simulator module 210 and/or the external sources 216 to generate different interactive UI simulations that include virtual or augmented representations of the assets. This can allow a user to dynamically interact with various assets via a UI, and/or allow a user to interactively view representations of other's interactions with various assets via a simulation presented via a UI.

In one embodiment, the simulator application(s) 212 can include recognition systems and databases that can vary depending on the implementation and can include, for example, text recognition systems and databases, image recognition systems and databases, landmark recognition systems and databases, and any other known type of recognition systems and databases. The simulator application(s) 212 can process information from data sources external sources 216. The data sources can include various different types of data sources that can be used to provide information and data that can be used to supplement other information that is displayed and/or identified. The one or more data sources data sources external sources 216 can include any number of backend systems including server systems and databases, cloud-based computing platforms, search engines, targeted data sources identified by search engines, social media platforms or services, open government data, etc. A cloud-based computing platform can include a network interface that allows a user of a user system to establish a communicative connection to the cloud-based computing platform over a network such as the Internet or any type of network described herein. The cloud-based computing platform includes an application platform that can give user systems access to various applications and database systems provided by the application platform via a cloud-based user interface. Examples of backend systems can include, for example, an on-premises exchange server, the system/servers used by a search engine (e.g., Google) to allow users to perform searches, the system/server used to retrieve information based on user input, etc. Each backend system can include one or more servers that work in conjunction with one or more databases and/or data processing components. Each of the recognition systems, databases, and data sources external sources 216 can be implemented using any number of servers (or server systems) and databases, repositories or other data storage systems that provide data and/or services to the user systems. Each of the recognition systems, databases, and data sources external sources 216 can be implemented using physical and/or virtual database server hardware or computer systems that are configured to communicate with user systems to perform the various functions described herein.

Each of the recognition systems, databases and data sources external sources 216 can operate with any sort of conventional processing hardware, such as a processor, memory, input/output features and the like. The processors may be implemented using any suitable processing system, such as one or more processors, controllers, microprocessors, microcontrollers, processing cores and/or other computing resources spread across any number of distributed or integrated systems, including any number of "cloud-based" or other virtual systems. Memory represents any non-transitory short or long-term storage or other computer-readable media capable of storing programming instructions for execution on the processor, including any sort of random-access memory (RAM), read only memory (ROM), flash memory, magnetic or optical mass storage, and/or the like. The computer-executable programming instructions, when read and executed by the servers and/or processors, cause the server and/or processor to create, generate, or otherwise facilitate providing data and information as described herein. It should be noted that the memory represents one suitable implementation of such computer-readable media, and alternatively or additionally, a server could receive and cooperate with external computer-readable media that is realized as a portable or mobile component or platform, e.g., a portable hard drive, a USB flash drive, an optical disc, or the like. The input/output features generally represent the interface(s) to networks (e.g., any other local area, wide area or other network), mass storage, display devices, data entry devices and/or the like.

In one embodiment, the action generator module 214 can be implemented as an application or a service provided by a system, such as the system described above with reference to FIG. 1. Alternatively, the action generator module 214 can be implemented independently as an application or a service that is external to a system, such as the system described above with reference to FIG. 1. The action generator module 214 can generate various actions in response to interaction with assets. The action generator module 214 can generate and trigger various actions based on information provided from the asset management module 204, the asset simulator module 210, the simulator application(s) 212 and/or external sources external sources 216. A few non-limiting examples of actions that can be triggered include: triggering various workflows within the cloud-based computing system 205; triggering the creation of new records within the cloud-based computing system 205 that are linked to the assets records that the user is interacting with; triggering generation of notifications/alerts to the user or others about the asset(s) being interacted with, etc. In one embodiment, the action generator module 214 can use the asset records to create interactive UIs. Interaction with the UIs can trigger various actions in response to a user interacting with any UI that includes information about the assets. These are a few of many possible actions that can be triggered in response to a user interacting with assets (and possibly other linked records).

Figure 4:
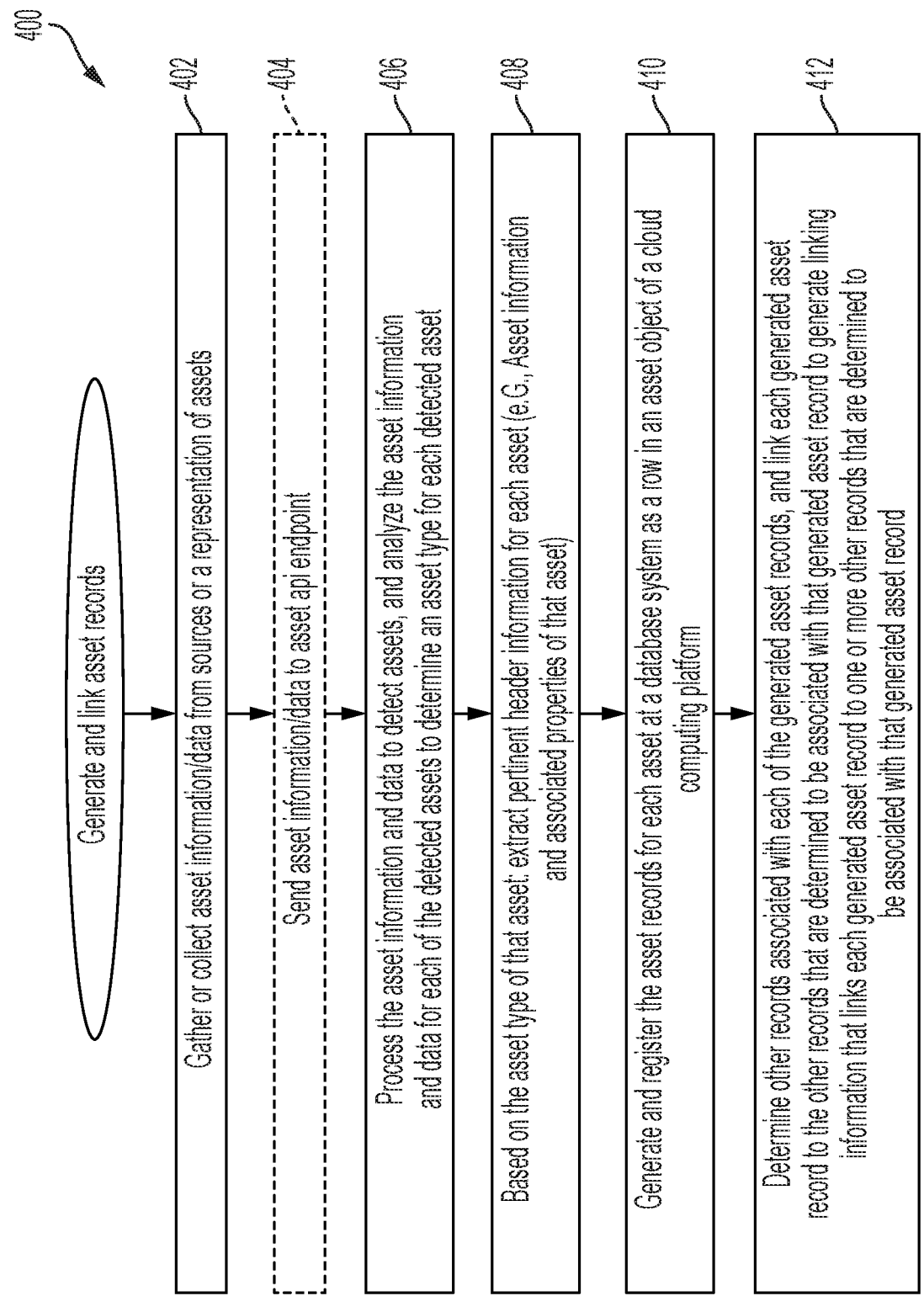
FIG. 4 is a flow chart that illustrates an exemplary method for automatically generating asset records and linking the asset records to other records that are stored and maintained at the database system of the cloud-based computing system in accordance with the disclosed embodiments.
Figure 6:
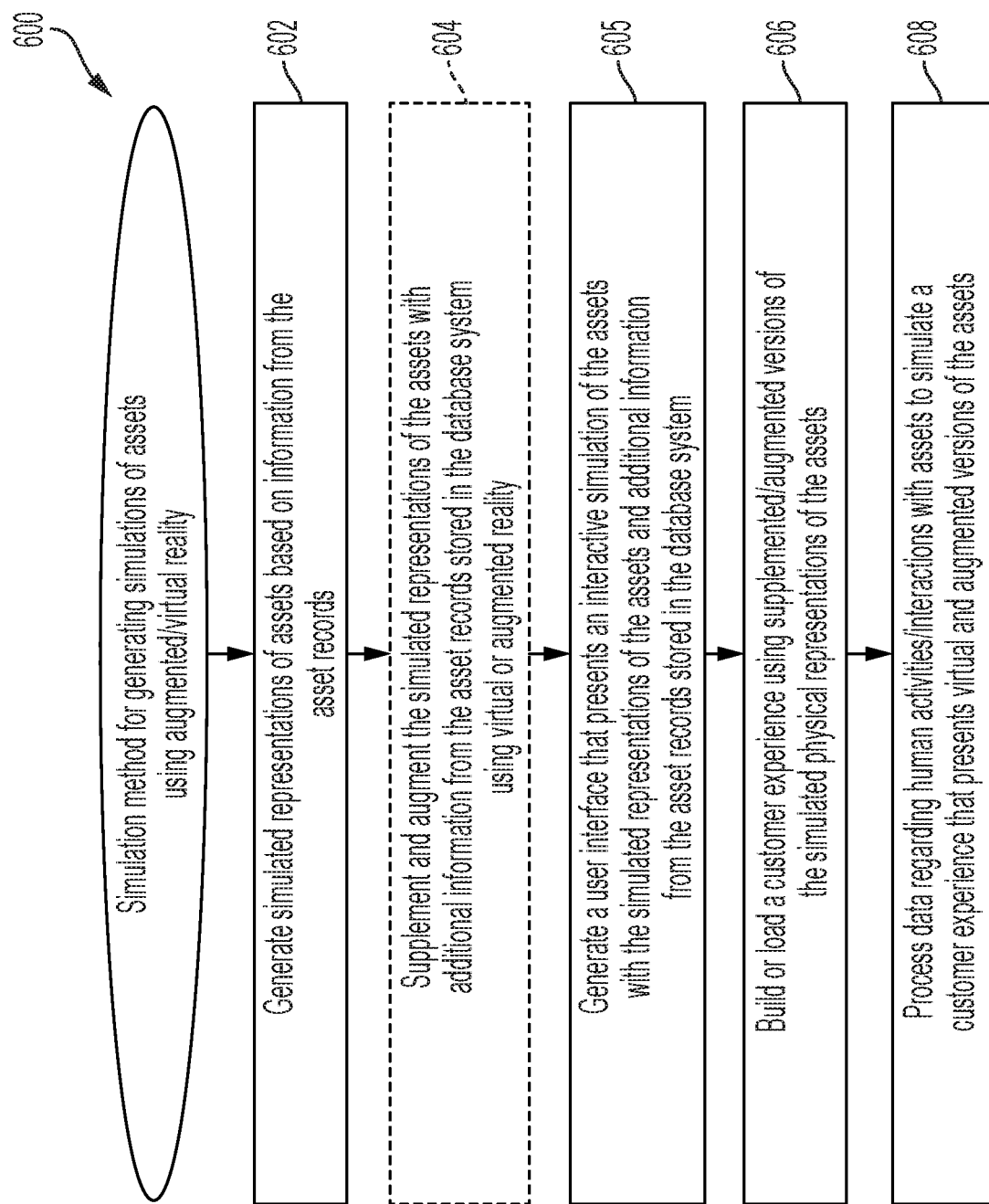
FIG. 6 is a flow chart that illustrates an exemplary simulation method for generating simulations of assets based on asset records using augmented/virtual reality in accordance with the disclosed embodiments.
Figure 8:
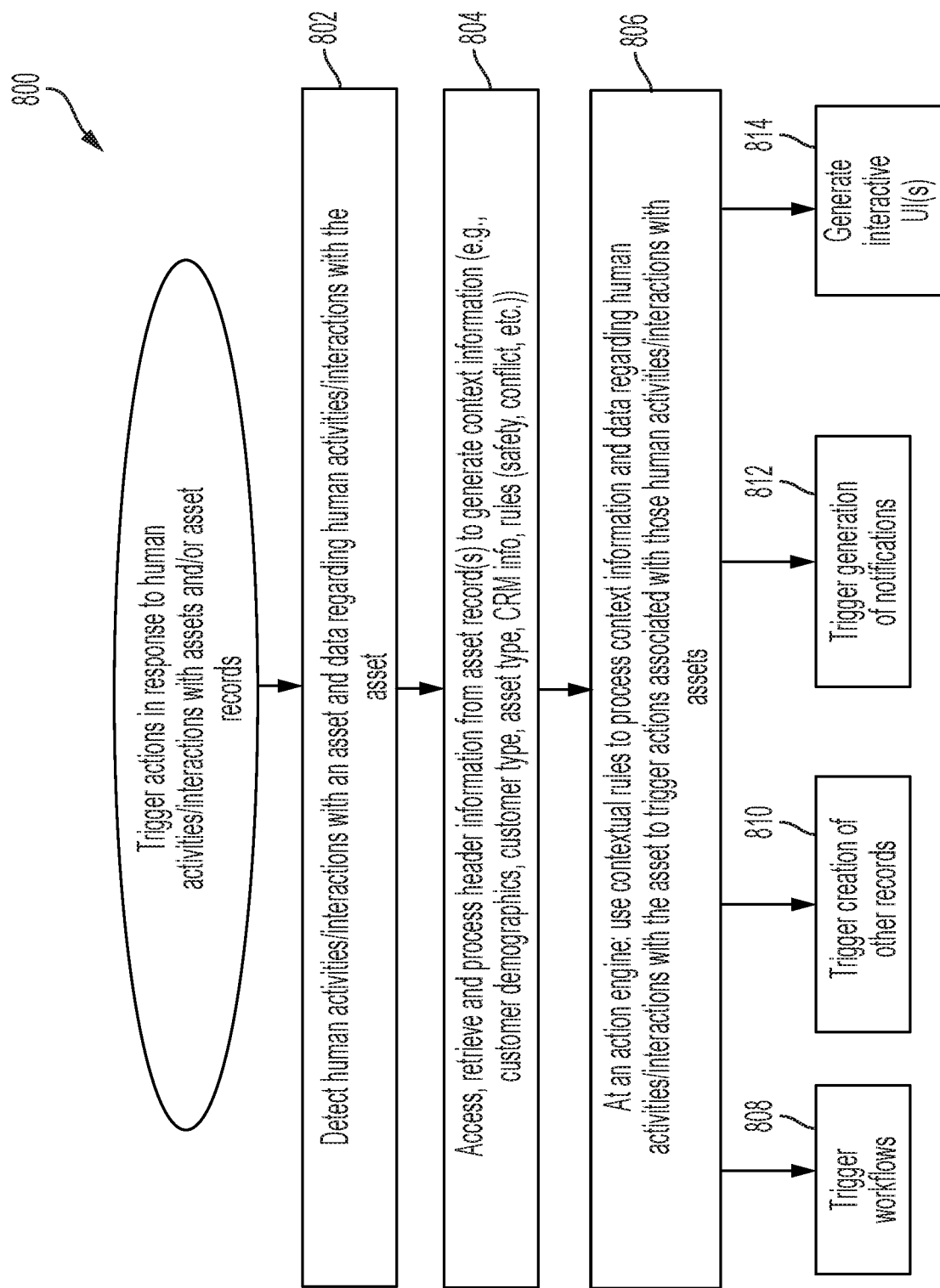
FIG. 8 is a flow chart that illustrates an exemplary method for generating or triggering actions in response to human activities/interactions with assets and/or asset records in accordance with the disclosed embodiments.

FIGS. 4, 6 and 8 are flow charts that illustrates examples of various methods in accordance with the disclosed embodiments. With respect to FIGS. 4, 6 and 8, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact.

Further, each method shown in FIGS. 4, 6 and 8 is computer-implemented in that various tasks or steps that are performed in connection with each method may be performed by software, hardware, firmware, or any combination thereof. For illustrative purposes, the following description of each method may refer to elements mentioned above in connection with FIGS. 1-3, 5, and 7. In certain embodiments, some or all steps of this process, and/or substantially equivalent steps, are performed by execution of processor-readable instructions stored or included on a processor-readable medium. For instance, in the description of FIGS. 4, 6 and 8 that follows, the system 100, the dynamic asset management system 200, the dynamic asset creation and management system 300, the asset simulation system 500 and the action generator system 700 (and any components of the system 100, the dynamic asset management system 200, the dynamic asset creation and management system 300, the asset simulation system 500 and the action generator system 700) are described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIGS. 4, 6 and 8, a particular example is described in which a user system performs certain actions by interacting with other elements of the system 100, the dynamic asset management system 200, the dynamic asset creation and management system 300, the asset simulation system 500 and the action generator system 700.

Figure 3:
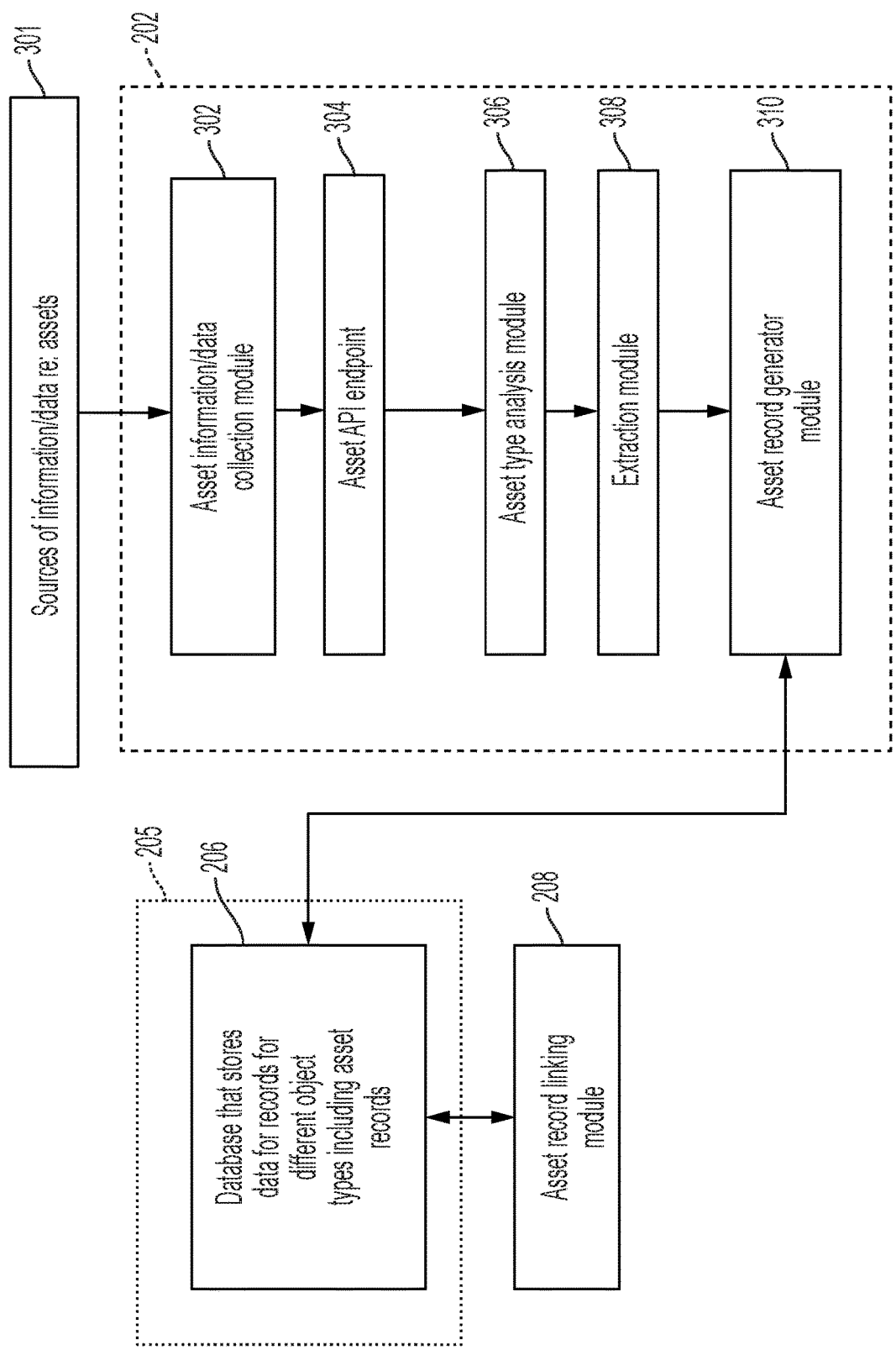
FIG. 3 is a block diagram that illustrates a dynamic asset creation and management system in accordance with the disclosed embodiments.

FIG. 3 is a block diagram that illustrates a dynamic asset creation and management system 300 in accordance with the disclosed embodiments. In particular, FIG. 3 illustrates the asset record generator module 202, the cloud-based computing system 205, the database system 206 and the asset record linking module 208 of the dynamic asset management system 200 of FIG. 2. FIG. 4 is a flow chart that illustrates a method 400 for automatically generating asset records and linking the asset records to other records that are stored and maintained at the database system 206 of the cloud-based computing system 205 in accordance with the disclosed embodiments. FIG. 4 will be described below with reference to various elements of FIG. 3.

At 402, the collection module 302 can gather or collect asset information/data from sources of information and data regarding assets or a representation of assets (e.g., physical objects). The sources 301 of information and data regarding assets can include, but are not limited to, images, blueprints, XML files, manual configuration information, API, vision detection data, and other sources. At 404, the collection module 302 can send asset information/data to an asset API endpoint 304, which in turn can provide the asset information/data to the asset type analysis module 306. At 406, the asset type analysis module 306 can process the asset information and data to detect assets, and analyze the asset information and data for each of the detected assets to determine an asset type for each detected asset (i.e., that it detected from the asset information and data).

At 408, the extraction module 308 can extract pertinent header information for each detected asset based on an asset type of that detected asset. The pertinent header information for each detected asset can include, for example the asset information for that detected asset and associated properties of that detected asset.

At 410, the asset record generator module 310 can generate an asset record for each detected asset, and register and store the generated asset records at the database system 206 of the cloud-based computing system 205 (e.g., a cloud computing platform such as Salesforce.com®). For instance, in one implementation, the asset record generator module 310 can create and store (e.g., via an API) the generated asset records for each detected asset as a row in an asset object of the database system of the cloud-based computing system 205, where each asset record for each detected asset can include pertinent header information for that detected asset such as asset information and data for that detected asset and associated properties of that detected asset.

At 412, the asset record linking module 208 can link asset records to other types of custom/standard records are stored the database system database system 206 of the cloud-based computing system 205. For example, in one embodiment, the asset record linking module 208 can determine other types of custom records or standard records that are stored at the database system of the cloud-based computing system and associated with each of the generated asset records, and then link each generated asset record to the other types of custom records or standard records that are determined to be associated with that generated asset record.

Figure 5:
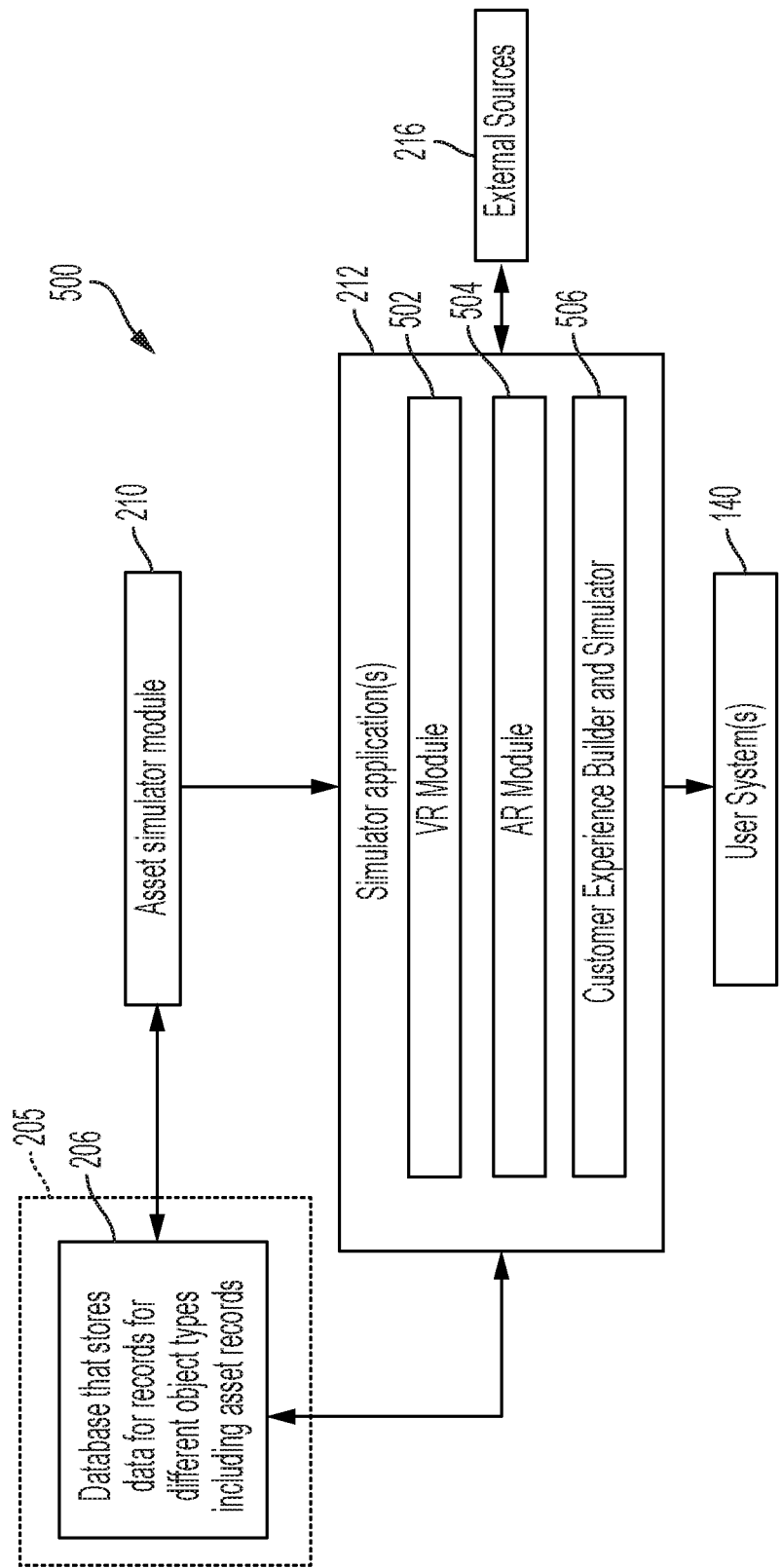
FIG. 5 is a block diagram that illustrates an asset simulation system in accordance with the disclosed embodiments.

FIG. 5 is a block diagram that illustrates an asset simulation system 500 in accordance with the disclosed embodiments. In particular, FIG. 5 illustrates the cloud-based computing system 205, the database system 206, the asset simulator module 210, the simulator application(s) 212, and the external sources 216 of the dynamic asset management system 200 of FIG. 2, as well as one or more user system(s) 140 that can interact with the cloud-based computing system 205 and the simulator application(s) 212. FIG. 6 is a flow chart that illustrates a simulation method 600 for generating simulations of assets based on asset records using augmented/virtual reality in accordance with the disclosed embodiments. In other words, the method 600 can be used to generate an interactive simulation representing one or more assets based on one or more asset records that were automatically generated by an asset record generator module and stored at the database system of the cloud-based computing system. FIG. 6 will be described below with reference to various elements of FIG. 5.

At 602, the asset simulator module 210 can generate simulated representations of assets based on information/data from the asset records stored in the database system 206.

At 604, the simulator application(s) 212 can supplement and augment the simulated representations of the assets with additional information from the asset records stored in the database system. This can be done using information from other types of records that are stored and maintained at the database system 206, and/or using information provided by the external sources 216 (including those described above with reference to FIG. 2). In one embodiment, the simulator application(s) 212 can supplement and/or augment the simulated representations of the assets using virtual reality (VR) module 502 for generating and combining real world images with virtual images or entities that represent real-world objects simulated via a computer, and/or augmented reality (AR) module 504 that augments simulated representations of the assets with additional information. In some implementations, virtual reality systems can generate a UI having a field of view that is either completely computer-generated, or may include real-world scenery as background, or that use portions of real-world images (e.g., a particular object, pattern, or texture) incorporated into a computer-generated environment, and/or that incorporate virtual images into real-world scenes.

For example, in one embodiment, the simulator application can generate a virtual simulation that includes the simulated representations of assets via a virtual reality (VR) module by combining real world images with virtual images or entities that represent real-world objects simulated via a computer to present the user interface (e.g., where the user interface a field of view that presents the virtual simulation that incorporates the simulated representations of assets with real-world images to present virtual images of the simulated representations of assets). In another embodiment, the augmented reality (AR) module can generate a user interface that presents an augmented simulation with the simulated representations of the assets along with the additional information that supplements or augments the simulated representations of the assets. For example, in some embodiments, this additional information can be extracted from the asset records stored in the database system; other additional information from other records (including those having different record types) stored in the database system; and one or more sources that are external to the cloud-based computing system. In another embodiment, the presentation approaches described above may be combined.

At 605, the simulator application(s) 212 can generate a user interface that presents an interactive simulation of the assets. In one implementation, the user interface can include the simulated representations of the assets with the additional information from the asset records stored in the database system. In another implementation, the simulated representations of the assets can include additional information from the asset records stored in the database system and information about other standard or custom records stored in the database system that have been linked to the asset records by an asset record linking module.

At 606, a customer experience builder and simulator module 506 of the simulator application(s) 212 can build or load a customer experience using the supplemented/augmented versions of the simulated physical representations of the assets. As used herein, a "customer experience" can refer to a user's overall interaction with the asset.

At 608, the simulator application(s) 212 can receive data regarding human activities or interactions with assets, and then process human activities and/or interactions with assets to simulate the customer experience via a UI by providing and presenting virtual and augmented versions of the assets via the UI. The virtual and augmented versions of the assets can show, demonstrate or otherwise present simulated physical representations of the assets. In one embodiment, at step 608, the simulator application(s) 212 can process inputs received from user system(s) 140, where the inputs can reflect human activities/interactions with assets to simulate a customer experience. Again, the customer experience can provide or present virtual and augmented versions of the assets.

Figure 7:
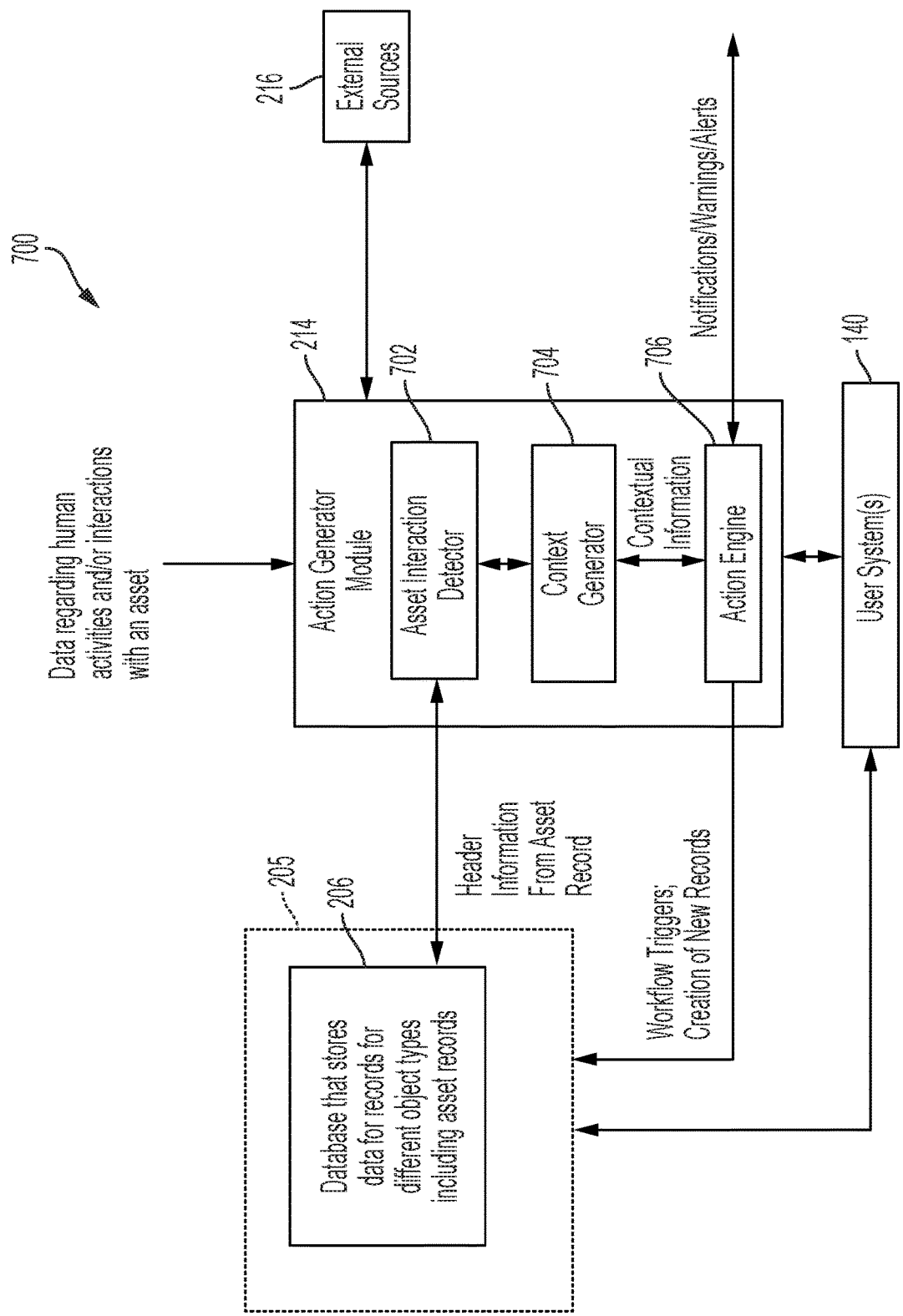
FIG. 7 is a block diagram that illustrates an action generator system in accordance with the disclosed embodiments.

FIG. 7 is a block diagram that illustrates an action generator system 700 in accordance with the disclosed embodiments. In particular, FIG. 7 illustrates the cloud-based computing system 205, the database system 206, the action generator module 214, and the external sources 216 of the dynamic asset management system 200 of FIG. 2, as well as one or more user system(s) 140 that can interact with the cloud-based computing system 205, the database system 206 and the action generator module 214. FIG. 8 is a flow chart that illustrates a method 800 for generating or triggering actions in response to human activities/interactions with assets and/or asset records in accordance with the disclosed embodiments. FIG. 8 will be described below with reference to various elements of FIG. 7 including an asset interaction detector 702, a context generator 704 and an action engine 706.

At 802, an asset interaction detector 702 of the action generator module 214 can detect human activities and/or interactions with an asset. In response to information that is indicative of the interaction with the asset, at 804, at least some information from an asset record (related to the asset) can be accessed and retrieved from the database system 206 of the cloud-based computing system 205. For example, in one embodiment, the information from the asset record comprises header information from one or more asset record(s) for that asset.

At 806, the action generator module 214 can process the information from the asset record and the information that is indicative of the interaction with the asset to generate one or more actions in response to the information that is indicative of the interaction with the asset. For example, in one embodiment, the action engine 706 can process the header information from the asset record and the information that is indicative of the interaction with the asset to generate context information. The context generator 704 can process the retrieved header information from asset record(s) for that asset to generate context information. The context information can be pulled from the database system 206 and/or other external sources 216. Examples of context information can include things such as customer demographics, customer type, asset type, CRM information, rules (e.g., safety, conflict, etc.), other data from other external sources 216, etc. In one embodiment, the action engine can use contextual rules to process the context information and the information that is indicative of the interaction with the asset to generate at least one action in response to the information that is indicative of the interaction with the asset. In other words, the action engine 706 can process, using contextual rules, the context information and optionally data regarding the human activities/interactions with the asset to trigger actions associated with those human activities/interactions with assets. The actions that are triggered can vary depending on the implementation. The examples at 808, 810 and 812 are non-limiting examples of different actions that can be triggered.

For example, in one embodiment, at 808, in response to the information that is indicative of the interaction with the asset, at least one workflow can be triggered in response to that interaction. For instance, at 808, as a result of the processing performed at 806, the action engine 706 can trigger automated processes or workflows that may (or may not) be associated with those human activities/interactions with assets. In one embodiment, a "workflow" can refer to an automated business process that can be specified using any number of workflow rules. As one non-limiting example, a workflow can refer to business logic that evaluates records (e.g., as they are created and updated) and determines if an automated action needs to occur. For instance, workflow rules can be defined that allow for certain things to be automatically done when certain customized criteria defined by that rule are satisfied, such as, sending an email, assigning or updating or creating a task, updating fields, etc.

In one implementation, a workflow can refer to a container or business logic engine which automates certain actions when particular criteria are satisfied. If the criteria are true, then immediate actions can be executed (e.g., immediately when the record is created or edited) or time-dependent actions can be executed (e.g., after a certain duration of time and all of the rule's criteria are still met). When any criteria are false, a record can be saved but no action will get executed. In this regard, criteria can refer to any condition that needs to be satisfied before an action is automatically executed. Each workflow rule can cause a workflow action when designated conditions of that workflow rule are met. In other words, a workflow rule can set workflow actions into motion when its designated conditions are met (e.g., a workflow action fires when the conditions of a workflow rule are met). A workflow action or "action" can refer to anything that automatically occurs when the criteria of the rule are satisfied. In one embodiment, workflow actions can be configured to execute immediately when a record meets the conditions in the workflow rule, or to set time triggers that execute the workflow actions at a specific day or time.

In another embodiment, at 810, in response to the information that is indicative of the interaction with the asset, the action generator module can create at least one new record within the database system that is associated with the asset record for the asset. For, as a result of the processing performed at 806, the action engine 706 can trigger creation of other records at the database system 206. The other records that are created may (or may not) be associated with the asset record, or may be other record types that may (or may not) be associated with asset record, or may be other asset records.

In another embodiment, at 812, in response to the information that is indicative of the interaction with the asset, the action generator module can generate notifications, alerts, warning messages, etc. and send them to a user system. These messages can indicate information about the asset being interacted with. For instance, as a result of the processing performed at 806, the action engine 706 can trigger generation of notifications, alerts, warnings, etc. that can be sent to user systems of users such as customers, service personnel, administrators, management, etc. Depending on the implementation, the notifications, alerts, warnings, etc. that are generated may (or may not) be associated with the asset record.

In another embodiment, at 814, the action generator module can generate, in response to the information that is indicative of the interaction with the asset, at least one interactive user interface, and display it at a user system. The at least one interactive user interface can include information about the asset, and can be generated based on the asset record or other records related to the asset record. In one implementation, at 814, the interactive user interface can include includes information about the asset and information from other records. In response to another interaction with the user interface, the action generator module can generate another action in response to that other interaction.

The following description is of one example of a system in which the features described above may be implemented. The components of the system described below are merely one example and should not be construed as limiting. The features described above with respect to FIGS. 1-8 may be implemented in any other type of computing environment, such as one with multiple servers, one with a single server, a multi-tenant server environment, a single-tenant server environment, or some combination of the above.

Figure 9:
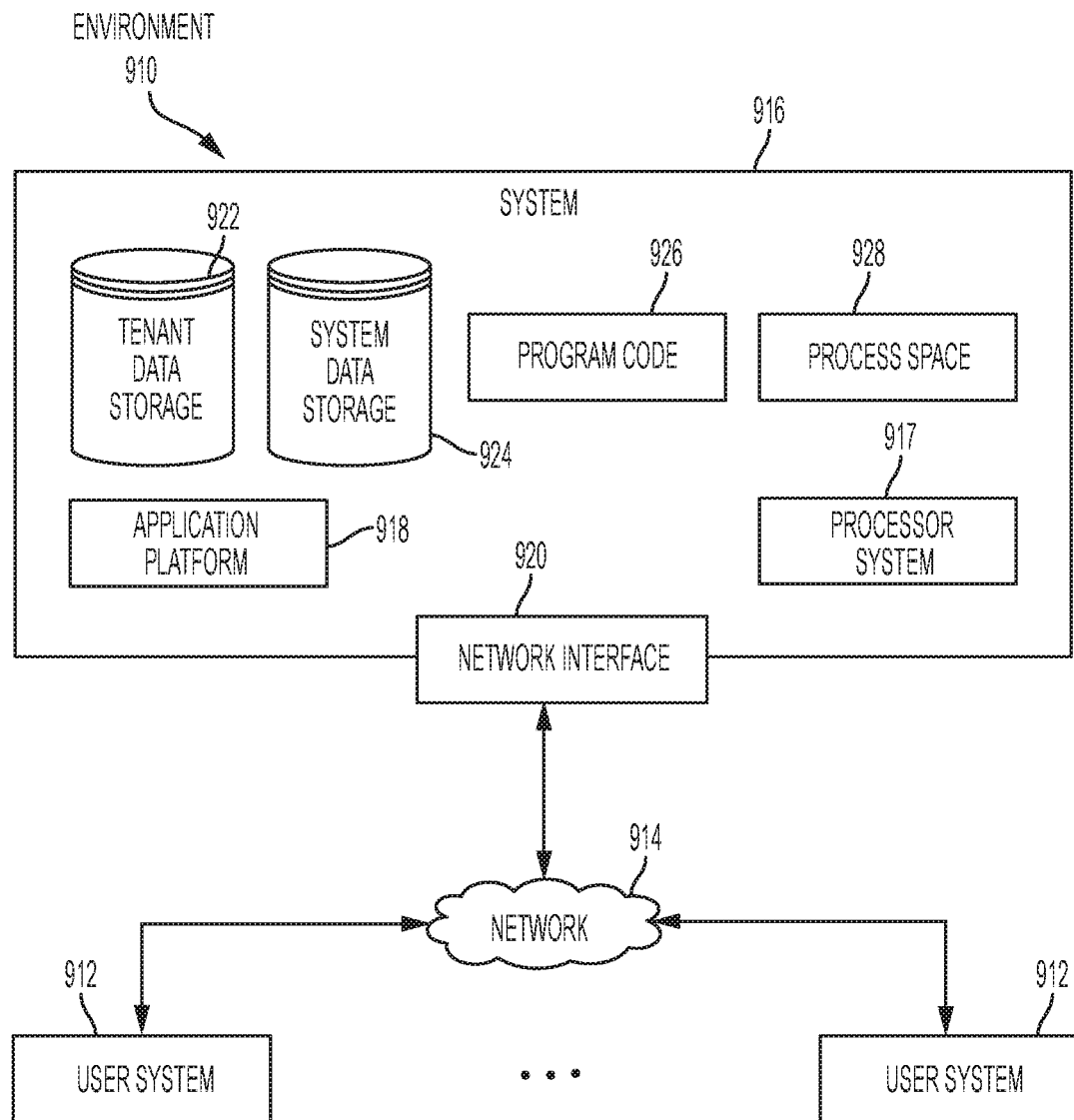
FIG. 9 shows a block diagram of an example of an environment in which an on-demand database service can be used in accordance with some implementations.

FIG. 9 shows a block diagram of an example of an environment 910 in which an on-demand database service can be used in accordance with some implementations. The environment 910 includes user systems 912, a network 914, a database system 916 (also referred to herein as a "cloud-based system"), a processor system 917, an application platform 918, a network interface 920, tenant database 922 for storing tenant data 923, system database 924 for storing system data 925, program code 926 for implementing various functions of the system 916, and process space 928 for executing database system processes and tenant-specific processes, such as running applications as part of an application hosting service. In some other implementations, environment 910 may not have all of these components or systems, or may have other components or systems instead of, or in addition to, those listed above.

In some implementations, the environment 910 is an environment in which an on-demand database service exists. An on-demand database service, such as that which can be implemented using the system 916, is a service that is made available to users outside of the enterprise(s) that own, maintain or provide access to the system 916. As described above, such users generally do not need to be concerned with building or maintaining the system 916. Instead, resources provided by the system 916 may be available for such users' use when the users need services provided by the system 916; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 918 can be a framework that allows the applications of system 916 to execute, such as the hardware or software infrastructure of the system 916. In some implementations, the application platform 918 enables the creation, management and execution of one or more applications developed by the provider of the on-demand database service, users accessing the on-demand database service via user systems 912, or third party application developers accessing the on-demand database service via user systems 912.

In some implementations, the system 916 implements a web-based customer relationship management (CRM) system. For example, in some such implementations, the system 916 includes application servers configured to implement and execute CRM software applications as well as provide related data, code, forms, renderable web pages and documents and other information to and from user systems 912 and to store to, and retrieve from, a database system related data, objects, and Web page content. In some MTS implementations, data for multiple tenants may be stored in the same physical database object in tenant database 922. In some such implementations, tenant data is arranged in the storage medium(s) of tenant database 922 so that data of one tenant is kept logically separate from that of other tenants so that one tenant does not have access to another tenant's data, unless such data is expressly shared. The system 916 also implements applications other than, or in addition to, a CRM application. For example, the system 916 can provide tenant access to multiple hosted (standard and custom) applications, including a CRM application. User (or third party developer) applications, which may or may not include CRM, may be supported by the application platform 918. The application platform 918 manages the creation and storage of the applications into one or more database objects and the execution of the applications in one or more virtual machines in the process space of the system 916.

According to some implementations, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 914 can be or include any network or combination of networks of systems or devices that communicate with one another. For example, the network 914 can be or include any one or any combination of a LAN (local area network), WAN (wide area network), telephone network, wireless network, cellular network, point-to-point network, star network, token ring network, hub network, or other appropriate configuration. The network 914 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 912 can communicate with system 916 using TCP/IP and, at a higher network level, other common Internet protocols to communicate, such as HTTP, FTP, AFS, WAP, etc. In an example where HTTP is used, each user system 912 can include an HTTP client commonly referred to as a "web browser" or simply a "browser" for sending and receiving HTTP signals to and from an HTTP server of the system 916. Such an HTTP server can be implemented as the sole network interface 920 between the system 916 and the network 914, but other techniques can be used in addition to or instead of these techniques. In some implementations, the network interface 920 between the system 916 and the network 914 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 912 can be implemented as any computing device(s) or other data processing apparatus or systems usable by users to access the database system 916. For example, any of user systems 912 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 912 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 916) of the user system 912 to access, process and view information, pages and applications available to it from the system 916 over the network 914.

Each user system 912 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 912 in conjunction with pages, forms, applications and other information provided by the system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 912 may differ in their respective capacities, and the capacity of a particular user system 912 can be entirely determined by permissions (permission levels) for the current user of such user system. For example, where a salesperson is using a particular user system 912 to interact with the system 916, that user system can have the capacities allotted to the salesperson. However, while an administrator is using that user system 912 to interact with the system 916, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 912 and some or all of its components are operator-configurable using applications, such as a browser, including computer code executed using a central processing unit (CPU) such as an Intel Pentium® processor or the like. Similarly, the system 916 (and additional instances of an MTS, where more than one is present) and all of its components can be operator-configurable using application(s) including computer code to run using the processor system 917, which may be implemented to include a CPU, which may include an Intel Pentium® processor or the like, or multiple CPUs.

The system 916 includes tangible computer-readable media having non-transitory instructions stored thereon/in that are executable by or used to program a server or other computing system (or collection of such servers or computing systems) to perform some of the implementation of processes described herein. For example, computer program code 926 can implement instructions for operating and configuring the system 916 to intercommunicate and to process web pages, applications and other data and media content as described herein. In some implementations, the computer code 926 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 10:
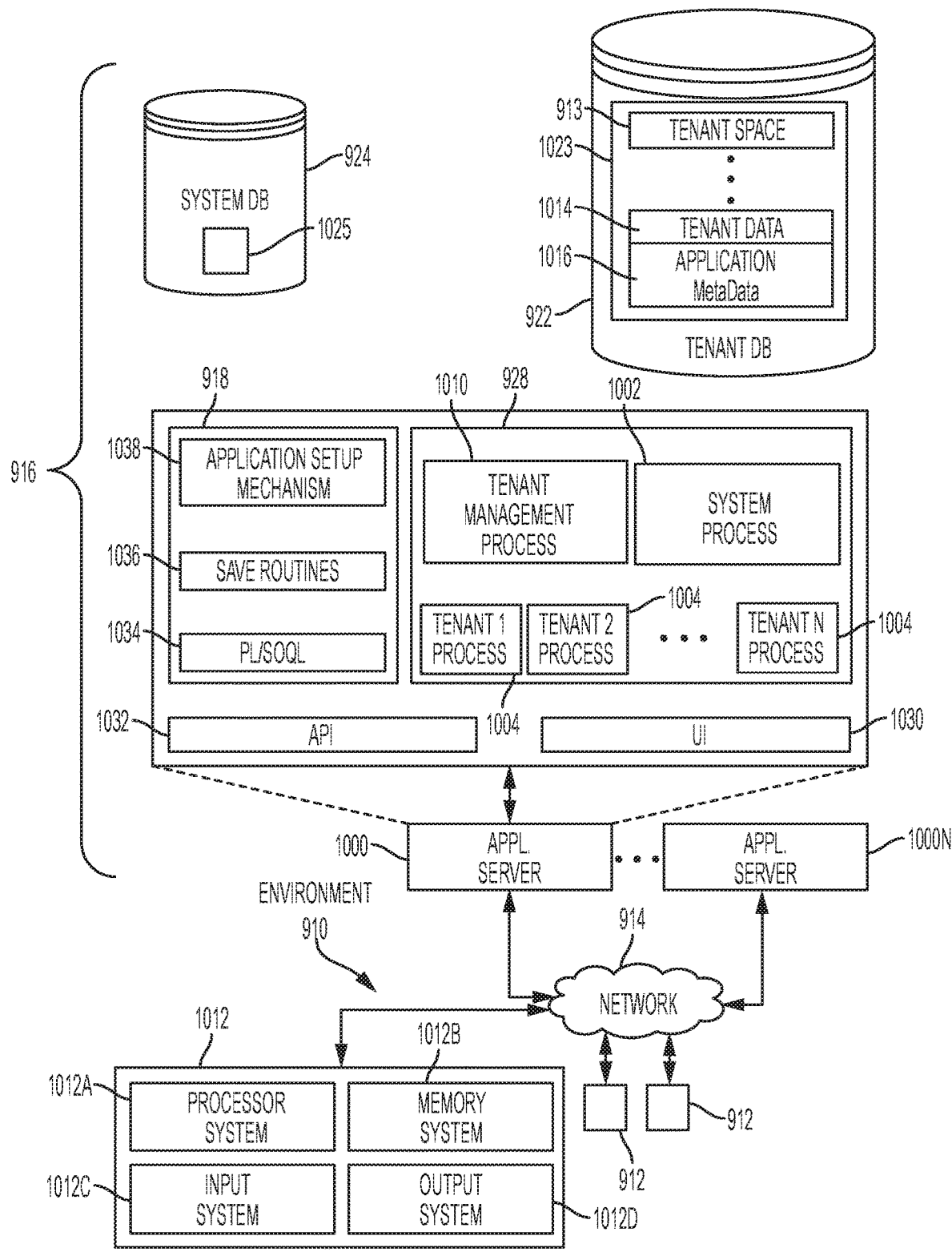
FIG. 10 shows a block diagram of example implementations of elements of FIG. 9 and example interconnections between these elements according to some implementations.

FIG. 10 shows a block diagram of example implementations of elements of FIG. 9 and example interconnections between these elements according to some implementations. That is, FIG. 10 also illustrates environment 910, but FIG. 10, various elements of the system 916 and various interconnections between such elements are shown with more specificity according to some more specific implementations. Elements from FIG. 9 that are also shown in FIG. 10 will use the same reference numbers in FIG. 10 as were used in FIG. 9. Additionally, in FIG. 10, the user system 912 includes a processor system 1012A, a memory system 1012B, an input system 1012C, and an output system 1012D. The processor system 1012A can include any suitable combination of one or more processors. The memory system 1012B can include any suitable combination of one or more memory devices. The input system 1012C can include any suitable combination of input devices, such as one or more touchscreen interfaces, keyboards, mice, trackballs, scanners, cameras, or interfaces to networks. The output system 1012D can include any suitable combination of output devices, such as one or more display devices, printers, or interfaces to networks.

In FIG. 10, the network interface 920 of FIG. 9 is implemented as a set of HTTP application servers 10001-1000N. Each application server 1000, also referred to herein as an "app server," is configured to communicate with tenant database 922 and the tenant data 1023 therein, as well as system database 924 and the system data 1025 therein, to serve requests received from the user systems 1012. The tenant data 1023 can be divided into individual tenant storage spaces 1013, which can be physically or logically arranged or divided. Within each tenant storage space 1013, tenant data 1014 and application metadata 1016 can similarly be allocated for each user. For example, a copy of a user's most recently used (MRU) items can be stored to user storage 1014. Similarly, a copy of MRU items for an entire organization that is a tenant can be stored to tenant storage space 1013.

The process space 928 includes system process space 1002, individual tenant process spaces 1004 and a tenant management process space 1010. The application platform 918 includes an application setup mechanism 1038 that supports application developers' creation and management of applications. Such applications and others can be saved as metadata into tenant database 922 by save routines 1036 for execution by subscribers as one or more tenant process spaces 1004 managed by tenant management process 1010, for example. Invocations to such applications can be coded using PL/SOQL 1034, which provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 916 of FIG. 10 also includes a user interface (UI) 1030 and an application programming interface (API) 1032 to system 916 resident processes to users or developers at user systems 1012. In some other implementations, the environment 910 may not have the same elements as those listed above or may have other elements instead of, or in addition to, those listed above.

Each application server 1000 can be communicably coupled with tenant database 922 and system database 924, for example, having access to tenant data 1023 and system data 1025, respectively, via a different network connection. For example, one application server 10001 can be coupled via the network 914 (for example, the Internet), another application server 1000N can be coupled via a direct network link, and another application server (not illustrated) can be coupled by yet a different network connection. Transfer Control Protocol and Internet Protocol (TCP/IP) are examples of typical protocols that can be used for communicating between application servers 1000 and the system 916. However, it will be apparent to one skilled in the art that other transport protocols can be used to optimize the system 916 depending on the network interconnections used.

In some implementations, each application server 1000 is configured to handle requests for any user associated with any organization that is a tenant of the system 916. Because it can be desirable to be able to add and remove application servers 1000 from the server pool at any time and for various reasons, in some implementations there is no server affinity for a user or organization to a specific application server 1000. In some such implementations, an interface system implementing a load balancing function (for example, an F5 Big-IP load balancer) is communicably coupled between the application servers 1000 and the user systems 1012 to distribute requests to the application servers 1000. In one implementation, the load balancer uses a least-connections algorithm to route user requests to the application servers 1000. Other examples of load balancing algorithms, such as round robin and observed-response-time, also can be used. For example, in some instances, three consecutive requests from the same user could hit three different application servers 1000, and three requests from different users could hit the same application server 1000. In this manner, by way of example, system 916 can be a multi-tenant system in which system 916 handles storage of, and access to, different objects, data and applications across disparate users and organizations.

In one example storage use case, one tenant can be a company that employs a sales force where each salesperson uses system 916 to manage aspects of their sales. A user can maintain contact data, leads data, customer follow-up data, performance data, goals and progress data, etc., all applicable to that user's personal sales process (for example, in tenant database 922). In an example of a MTS arrangement, because all of the data and the applications to access, view, modify, report, transmit, calculate, etc., can be maintained and accessed by a user system 1012 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 916 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 916 also can maintain system level data usable by multiple tenants or other data. Such system level data can include industry reports, news, postings, and the like that are sharable among tenants.

In some implementations, the user systems 1012 (which also can be client systems) communicate with the application servers 1000 to request and update system-level and tenant-level data from the system 916. Such requests and updates can involve sending one or more queries to tenant database 922 or system database 924. The system 916 (for example, an application server 1000 in the system 916) can automatically generate one or more SQL statements (for example, one or more SQL queries) designed to access the desired information. System database 924 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 11A:
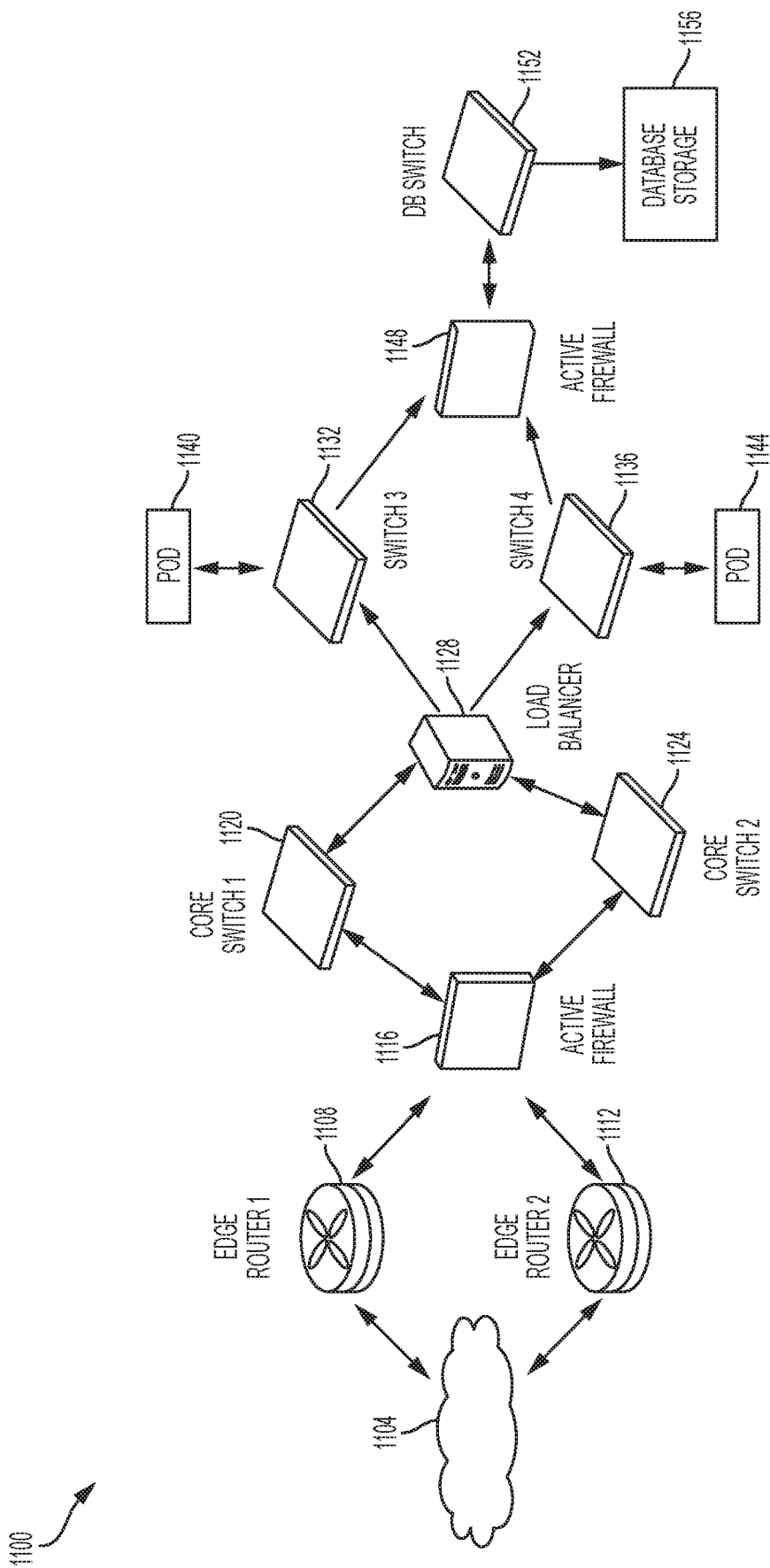
FIG. 11A shows a system diagram illustrating example architectural components of an on-demand database service environment according to some implementations.

FIG. 11A shows a system diagram illustrating example architectural components of an on-demand database service environment 1100 according to some implementations. A client machine communicably connected with the cloud 1104, generally referring to one or more networks in combination, as described herein, can communicate with the on-demand database service environment 1100 via one or more edge routers 1108 and 1112. A client machine can be any of the examples of user systems 12 described above. The edge routers can communicate with one or more core switches 1120 and 1124 through a firewall 1116. The core switches can communicate with a load balancer 1128, which can distribute server load over different pods, such as the pods 1140 and 1144. The pods 1140 and 1144, which can each include one or more servers or other computing resources, can perform data processing and other operations used to provide on-demand services. Communication with the pods can be conducted via pod switches 1132 and 1136. Components of the on-demand database service environment can communicate with database storage 1156 through a database firewall 1148 and a database switch 1152.

Figure 11B:
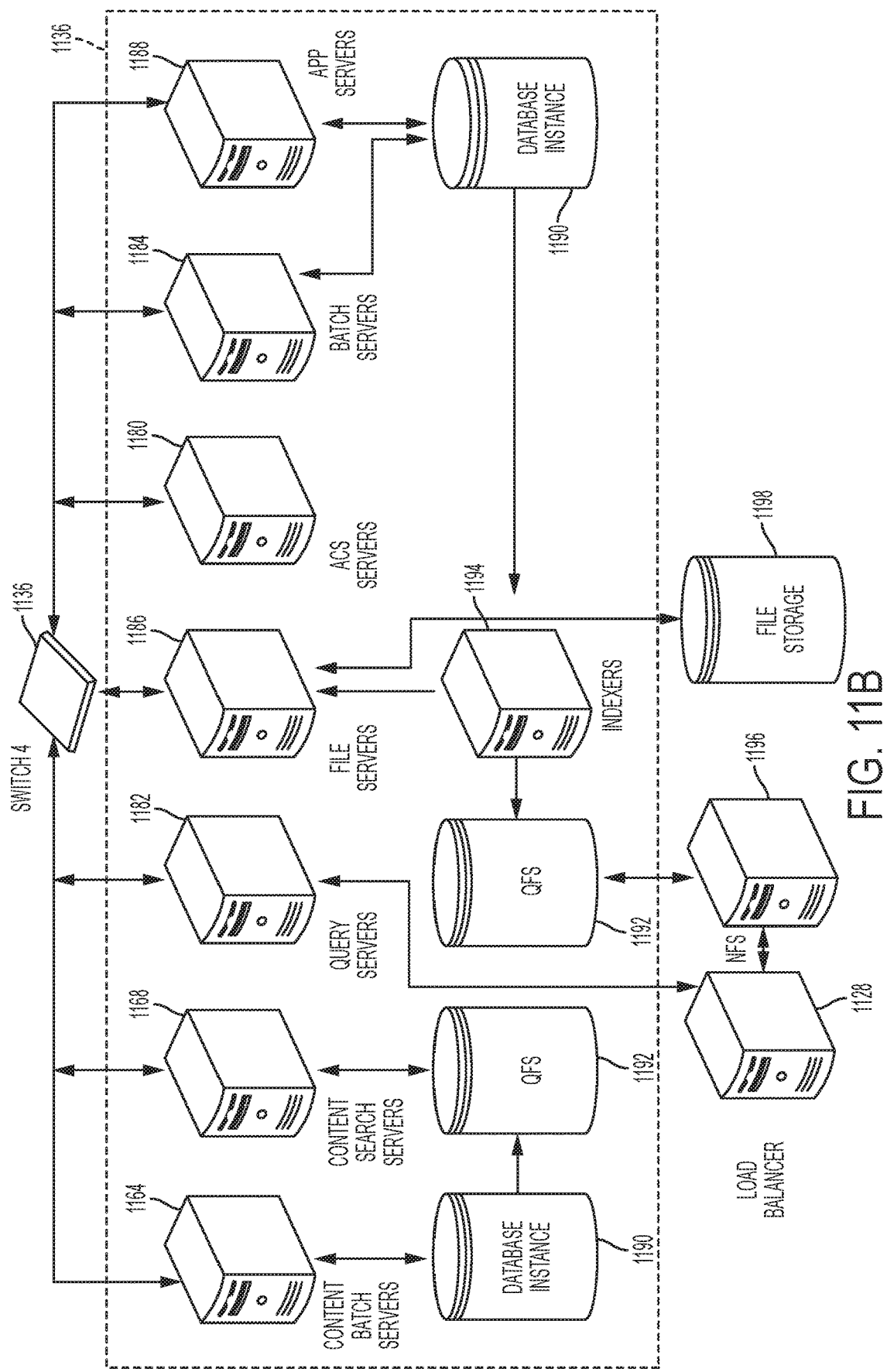
FIG. 11B shows a system diagram further illustrating example architectural components of an on-demand database service environment according to some implementations.

As shown in FIGS. 11A and 11B, accessing an on-demand database service environment can involve communications transmitted among a variety of different hardware or software components. Further, the on-demand database service environment 1100 is a simplified representation of an actual on-demand database service environment. For example, while only one or two devices of each type are shown in FIGS. 11A and 11B, some implementations of an on-demand database service environment can include anywhere from one to several devices of each type. Also, the on-demand database service environment need not include each device shown in FIGS. 11A and 11B, or can include additional devices not shown in FIGS. 11A and 11B.

Additionally, it should be appreciated that one or more of the devices in the on-demand database service environment 1100 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1104 is intended to refer to a data network or multiple data networks, often including the Internet. Client machines communicably connected with the cloud 1104 can communicate with other components of the on-demand database service environment 1100 to access services provided by the on-demand database service environment. For example, client machines can access the on-demand database service environment to retrieve, store, edit, or process information. In some implementations, the edge routers 1108 and 1112 route packets between the cloud 1104 and other components of the on-demand database service environment 1100. For example, the edge routers 1108 and 1112 can employ the Border Gateway Protocol (BGP). The BGP is the core routing protocol of the Internet. The edge routers 1108 and 1112 can maintain a table of IP networks or 'prefixes', which designate network reachability among autonomous systems on the Internet.

In some implementations, the firewall 1116 can protect the inner components of the on-demand database service environment 1100 from Internet traffic. The firewall 1116 can block, permit, or deny access to the inner components of the on-demand database service environment 1100 based upon a set of rules and other criteria. The firewall 1116 can act as one or more of a packet filter, an application gateway, a stateful filter, a proxy server, or any other type of firewall.

In some implementations, the core switches 1120 and 1124 are high-capacity switches that transfer packets within the on-demand database service environment 1100. The core switches 1120 and 1124 can be configured as network bridges that quickly route data between different components within the on-demand database service environment. In some implementations, the use of two or more core switches 1120 and 1124 can provide redundancy or reduced latency.

In some implementations, the pods 1140 and 1144 perform the core data processing and service functions provided by the on-demand database service environment. Each pod can include various types of hardware or software computing resources. An example of the pod architecture is discussed in greater detail with reference to FIG. 11 DDDD. In some implementations, communication between the pods 1140 and 1144 is conducted via the pod switches 1132 and 1136. The pod switches 1132 and 1136 can facilitate communication between the pods 1140 and 1144 and client machines communicably connected with the cloud 1104, for example via core switches 1120 and 1124. Also, the pod switches 1132 and 1136 may facilitate communication between the pods 1140 and 1144 and the database storage 1156. In some implementations, the load balancer 1128 can distribute workload between the pods 1140 and 1144. Balancing the on-demand service requests between the pods can assist in improving the use of resources, increasing throughput, reducing response times, or reducing overhead. The load balancer 1128 may include multilayer switches to analyze and forward traffic.

In some implementations, access to the database storage 1156 is guarded by a database firewall 1148. The database firewall 1148 can act as a computer application firewall operating at the database application layer of a protocol stack. The database firewall 1148 can protect the database storage 1156 from application attacks such as structure query language (SQL) injection, database rootkits, and unauthorized information disclosure. In some implementations, the database firewall 1148 includes a host using one or more forms of reverse proxy services to proxy traffic before passing it to a gateway router. The database firewall 1148 can inspect the contents of database traffic and block certain content or database requests. The database firewall 1148 can work on the SQL application level atop the TCP/IP stack, managing applications' connection to the database or SQL management interfaces as well as intercepting and enforcing packets traveling to or from a database network or application interface.

In some implementations, communication with the database storage 1156 is conducted via the database switch 1152. The multi-tenant database storage 1156 can include more than one hardware or software components for handling database queries. Accordingly, the database switch 1152 can direct database queries transmitted by other components of the on-demand database service environment (for example, the pods 1140 and 1144) to the correct components within the database storage 1156. In some implementations, the database storage 1156 is an on-demand database system shared by many different organizations as described above with reference to FIG. 1, FIG. 9 and FIG. 10.

FIG. 11B shows a system diagram further illustrating example architectural components of an on-demand database service environment according to some implementations. The pod 1144 can be used to render services to a user of the on-demand database service environment 1100. In some implementations, each pod includes a variety of servers or other systems. The pod 1144 includes one or more content batch servers 1164, content search servers 1168, query servers 1182, file force servers 1186, access control system (ACS) servers 1180, batch servers 1184, and app servers 1188. The pod 1144 also can include database instances 1190, quick file systems (QFS) 1192, and indexers 1194. In some implementations, some or all communication between the servers in the pod 1144 can be transmitted via the switch 1136.

In some implementations, the app servers 1188 include a hardware or software framework dedicated to the execution of procedures (for example, programs, routines, scripts) for supporting the construction of applications provided by the on-demand database service environment 1100 via the pod 1144. In some implementations, the hardware or software framework of an app server 1188 is configured to execute operations of the services described herein, including performance of the blocks of various methods or processes described herein. In some alternative implementations, two or more app servers 1188 can be included and cooperate to perform such methods, or one or more other servers described herein can be configured to perform the disclosed methods.

The content batch servers 1164 can handle requests internal to the pod. Some such requests can be long-running or not tied to a particular customer. For example, the content batch servers 1164 can handle requests related to log mining, cleanup work, and maintenance tasks. The content search servers 1168 can provide query and indexer functions. For example, the functions provided by the content search servers 1168 can allow users to search through content stored in the on-demand database service environment. The file force servers 1186 can manage requests for information stored in the File force storage 1198. The File force storage 1198 can store information such as documents, images, and basic large objects (BLOBs). By managing requests for information using the file force servers 1186, the image footprint on the database can be reduced. The query servers 1182 can be used to retrieve information from one or more file storage systems. For example, the query system 1182 can receive requests for information from the app servers 1188 and transmit information queries to the NFS 1196 located outside the pod.

The pod 1144 can share a database instance 1190 configured as a multi-tenant environment in which different organizations share access to the same database. Additionally, services rendered by the pod 1144 may call upon various hardware or software resources. In some implementations, the ACS servers 1180 control access to data, hardware resources, or software resources. In some implementations, the batch servers 1184 process batch jobs, which are used to run tasks at specified times. For example, the batch servers 1184 can transmit instructions to other servers, such as the app servers 1188, to trigger the batch jobs.

In some implementations, the QFS 1192 is an open source file storage system available from Sun Microsystems® of Santa Clara, Calif. The QFS can serve as a rapid-access file storage system for storing and accessing information available within the pod 1144. The QFS 1192 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1168 or indexers 1194 to identify, retrieve, move, or update data stored in the network file storage systems 1196 or other storage systems.

In some implementations, one or more query servers 1182 communicate with the NFS 1196 to retrieve or update information stored outside of the pod 1144. The NFS 1196 can allow servers located in the pod 1144 to access information to access files over a network in a manner similar to how local storage is accessed. In some implementations, queries from the query servers 1182 are transmitted to the NFS 1196 via the load balancer 1128, which can distribute resource requests over various resources available in the on-demand database service environment. The NFS 1196 also can communicate with the QFS 1192 to update the information stored on the NFS 1196 or to provide information to the QFS 1192 for use by servers located within the pod 1144.

In some implementations, the pod includes one or more database instances 1190. The database instance 1190 can transmit information to the QFS 1192. When information is transmitted to the QFS, it can be available for use by servers within the pod 1144 without using an additional database call. In some implementations, database information is transmitted to the indexer 1194. Indexer 1194 can provide an index of information available in the database 1190 or QFS 1192. The index information can be provided to file force servers 1186 or the QFS 1192.

Figure 12:
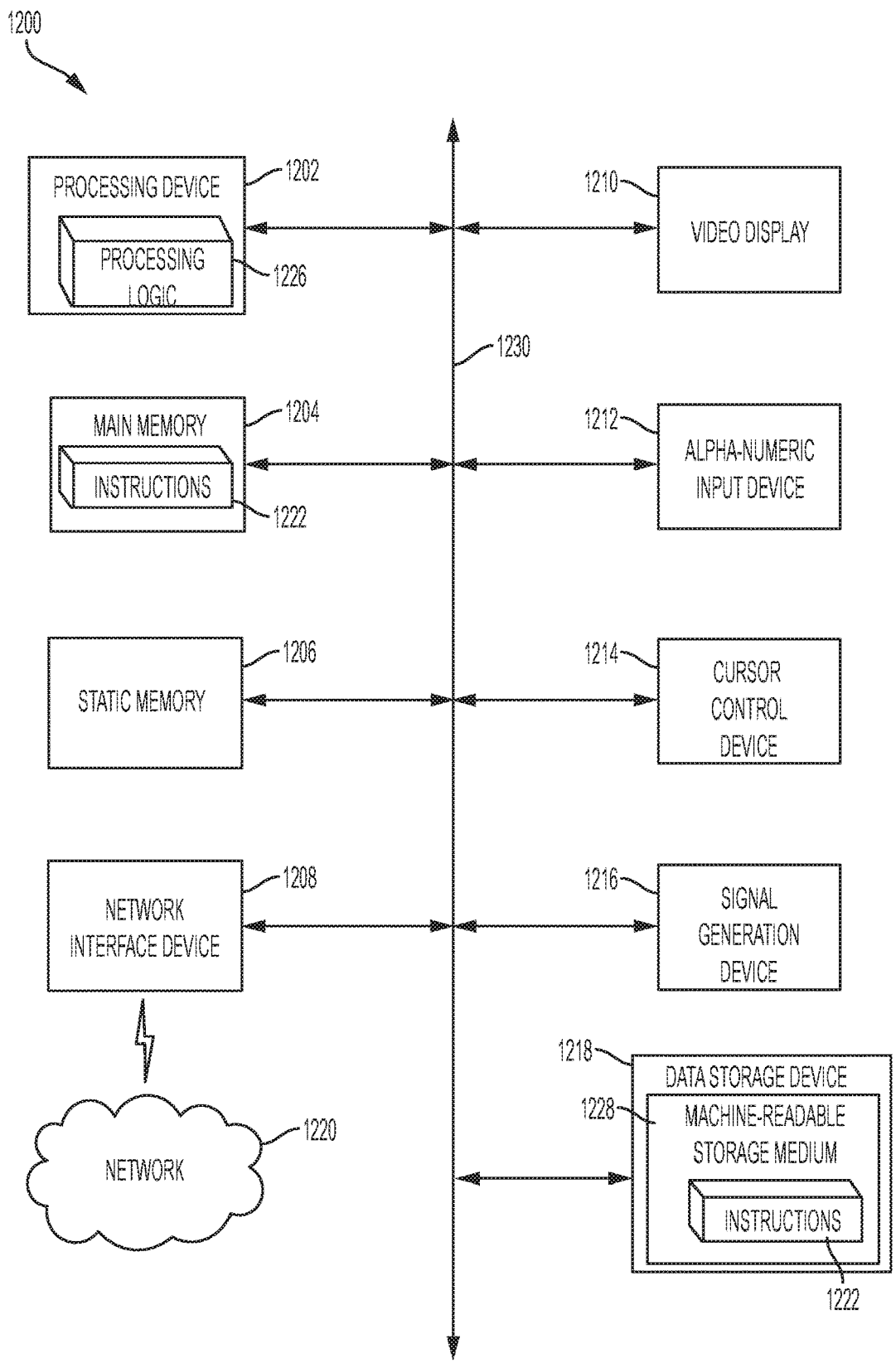
FIG. 12 illustrates a diagrammatic representation of a machine in the exemplary form of a computer system within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. The system 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 any of the blocks, components or entities shown in FIGS. 1-3, 5, 7 and 9-11B.

The exemplary computer system 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable medium 1228 on which is stored one or more sets of instructions 1222 (e.g., instructions of in-memory buffer service 114) embodying any one or more of the methodologies or functions described herein. The instructions 1222 may also reside, completely or at least partially, within the main memory 1204 and/or within processing logic 1226 of the processing device 1202 during execution thereof by the computer system 1200, the main memory 1204 and the processing device 1202 also constituting computer-readable media. The instructions may further be transmitted or received over a network 1220 via the network interface device 1208.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes (e.g., a special-purpose computer), or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose or special-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for automatically generating asset records that are stored and maintained at a database system of a cloud-based computing system, the method comprising:
    acquiring asset information and data for an asset from one or more sources of information and data regarding the asset or a representation of the asset;
    processing the asset information and data to detect the asset and analyzing the asset information and data for the detected asset to determine an asset type for the detected asset;
    extracting, based on the asset type of the detected asset, header information for an asset record of the asset type, wherein the header information for the asset record comprises the asset information and data for the detected asset, and associated properties of the detected asset;
    automatically generating the asset record for the detected asset, and storing the generated asset record at the database system of the cloud-based computing system; and
    in response to information indicative of user interaction with the asset or the asset record:
        automatically creating, based on the header information for the asset record, a new record at the database system that is associated with the asset record; and
        creating a parent-child relationship between the generated asset record and the new record by using a field of the new record to link the generated asset record to the new record associated with the generated asset record at the database system.

2. The method of claim 1, wherein the asset is a physical object located at a specific location in an environment, and wherein the associated properties of the asset comprise a name, an identifier and a location of that detected asset within the environment.

3. The method of claim 1, wherein the new record comprises a type of custom record stored at the database system of the cloud-based computing system.

4. The method of claim 1, wherein the one or more sources of the information and data regarding the asset or the representation of the asset comprise:
    an imaging device configured to acquire an image of the asset and process data to generate the information and data regarding the asset;
    a vision detection system configured to acquire or extract vision detection data from an environment and process data to generate the information and data regarding the asset; and
    a drone equipped with a camera configured to acquire images of the asset and process data to generate the information and data regarding the asset.

5. The method of claim 1, wherein the one or more sources of the information and data regarding the asset or the representation of the asset comprise:
    an electronic blueprint of an environment that describes the asset within the environment and includes asset information and data; and
    files that describe the asset and that include asset information and data.

6. The method of claim 1, wherein the one or more sources of the information and data regarding the asset or the representation of the asset comprise:
    a source that provides information and data that identifies a three-dimensional location of the asset and characteristics of the asset; and
    manual configuration information that describes the asset including information and data that identifies the three-dimensional location of the asset and the characteristics of the asset.

7. The method of claim 1, wherein the one or more sources of the information and data regarding the asset or the representation of the asset comprise:
    a processor configured to process data and to generate information and data regarding the asset or the representation of the asset, wherein the data processed by the processor is acquired by an application programming interface (API) that is used to acquire information that describes the asset.

8. A cloud-based computing system comprising:
    a database system configured to configured to maintain records, wherein each record is an instance of an object; and
    a server system comprising at least one hardware-based processing system and a dynamic asset creation and management system for automatically creating asset records that are stored and maintained in the database system, wherein the dynamic asset creation and management system comprises instructions that when executed by the at least one hardware-based processing system are configurable to cause:
        acquiring asset information and data for an asset, from one or more sources of information and data regarding the asset or a representation of the asset;
        processing the asset information and data to detect the asset and analyzing the asset information and data for the detected asset to determine an asset type for the detected asset;
        extracting, based on the asset type of that detected asset, header information for an asset record of the asset type, wherein the header information for the asset record comprises the asset information and data for that detected asset and associated properties of the detected asset;

automatically generating the asset record for the detected asset, and storing the generated asset record at the database system of the cloud-based computing system; and in response to information indicative of user interaction with the asset or the asset record:

automatically creating, based on the header information for the asset record, a new record at the database system that is associated with the asset record; and creating a parent-child relationship between the generated asset record and the new record by using a field of the new record to link the generated asset record to the new record associated with the generated asset record at the database system.

9. The cloud-based computing system of claim 8, wherein the asset comprises a physical object located at a specific location in an environment, and wherein the associated properties comprise a name, an identifier and a location of that detected asset within the environment.

10. The cloud-based computing system of claim 8, wherein the one or more sources of the information and data regarding the asset or the representation of the asset comprise:

an imaging device configured to acquire an image of the asset and process data to generate the information and data regarding the asset;

a vision detection system configured to acquire or extract vision detection data from an environment and process data to generate the information and data regarding the asset; and a drone equipped with a camera configured to acquire images of the asset and process data to generate the information and data regarding the asset.

11. The cloud-based computing system of claim 8, wherein the one or more sources of the information and data regarding the asset or the representation of the asset comprise:

an electronic blueprint of an environment that describes the asset within the environment and includes asset information and data; and files that describe the asset and that include asset information and data.

12. The cloud-based computing system of claim 8, wherein the one or more sources of the information and data regarding the asset or the representation of the asset comprise:

a source that provides information and data that identifies a three-dimensional location of the asset and characteristics of the asset; and manual configuration information that describes the asset including information and data that identifies the three-dimensional location of the asset and the characteristics of the asset.

13. A system comprising at least one hardware-based processor and memory, wherein the memory comprises processor-executable instructions encoded on a non-transient processor-readable media, wherein the processor-executable instructions, when executed by the processor, are configurable to cause:

acquiring asset information and data for an asset, from one or more sources of information and data regarding the asset or a representation of the asset, wherein the asset comprises a physical object located at specific locations in an environment;

processing the asset information and data to detect the asset and analyzing the asset information and data for the detected asset to determine an asset type for the detected asset;

extracting, based on the asset type of the detected asset, header information for an asset record of the asset type, wherein the header information for the asset record comprises the asset information and data for the detected asset, and associated properties of the detected asset;

automatically generating the asset record for the detected asset; and storing the generated asset record at a database system as a row in an asset object of the database system, wherein the asset record for the detected asset comprises the header information for that detected asset; and in response to information indicative of user interaction with the asset or the asset record:

automatically creating, based on the header information for the asset record, a new record at the database system that is associated with the asset record; and creating a parent-child relationship between the generated asset record and the new record by using a field of the new record to link the generated asset record to the new record associated with the generated asset record at the database system.

14. The method of claim 1, wherein the field comprises a custom field defined by a user.

15. The method of claim 1, wherein the creating the parent-child relationship between the generated asset record and the new record comprises using an asset level field of the asset record to indicate position in an asset hierarchy.

16. The method of claim 1, wherein the new record comprises a replacement or an upgrade.

17. The method of claim 1, wherein:

the new record comprises a custom object including one or more custom fields defined by a particular organization for that custom object, and the asset record comprises a standard object including one or more pre-defined fields that are common for each organization that utilizes the cloud-based computing system.

18. The method of claim 17, wherein creating the parent-child relationship between the generated asset record and the new record comprises:

using an asset level field of the asset record to indicate the asset record is a parent of the new record.

19. The method of claim 1, further comprising updating linking information between the asset record and the new record when the asset is interacted with.

* * * * *